US008610809B2

(12) United States Patent
Ebihara

(10) Patent No.: US 8,610,809 B2
(45) Date of Patent: Dec. 17, 2013

(54) SOLID-STATE IMAGING DEVICE AND CAMERA SYSTEM THAT CONTROLS A UNIT OF PLURAL ROWS

(75) Inventor: Hiroaki Ebihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 413 days.

(21) Appl. No.: 12/923,542

(22) Filed: Sep. 28, 2010

(65) Prior Publication Data

US 2011/0102623 A1    May 5, 2011

(30) Foreign Application Priority Data

Nov. 2, 2009    (JP) .................................. 2009-252442

(51) Int. Cl.
*H04N 5/335*    (2011.01)

(52) U.S. Cl.
USPC ........................................................ 348/294

(58) Field of Classification Search
USPC ........................................................ 348/294
See application file for complete search history.

(56) References Cited

U.S. PATENT DOCUMENTS

| | | | |
|---|---|---|---|
| 4,835,617 A | 5/1989 | Todaka et al. | |
| 6,549,234 B1 * | 4/2003 | Lee | 348/302 |
| 6,714,239 B2 * | 3/2004 | Guidash | 348/223.1 |
| 7,745,773 B1 * | 6/2010 | Merrill | 250/208.1 |
| 7,839,439 B2 * | 11/2010 | Sato et al. | 348/241 |
| 2005/0057673 A1 | 3/2005 | Shimomura et al. | |
| 2007/0126901 A1 | 6/2007 | Kuroda | |
| 2008/0036892 A1 | 2/2008 | Gomi | |
| 2008/0055436 A1 * | 3/2008 | Sarwari et al. | 348/272 |
| 2008/0158402 A1 | 7/2008 | Okano et al. | |
| 2008/0192133 A1 | 8/2008 | Abiru et al. | |
| 2008/0284876 A1 | 11/2008 | Makino | |
| 2008/0284883 A1 | 11/2008 | Asahi | |
| 2008/0284884 A1 | 11/2008 | Makino et al. | |
| 2009/0086049 A1 | 4/2009 | Fujita et al. | |
| 2009/0140122 A1 * | 6/2009 | Suzuki | 250/201.2 |
| 2009/0237524 A1 | 9/2009 | Asahi | |

FOREIGN PATENT DOCUMENTS

| | | |
|---|---|---|
| GB | 2 338 365 A | 12/1999 |
| JP | 2008-193618 | 8/2008 |
| JP | 2008-288903 | 11/2008 |

OTHER PUBLICATIONS

Extended European Search Report issued Nov. 17, 2011 for corresponding European Application No. 10 18 8837.

* cited by examiner

*Primary Examiner* — Gary C Vieaux
(74) *Attorney, Agent, or Firm* — Rader, Fishman & Grauer PLLC

(57) ABSTRACT

A solid-state imaging device includes: a pixel unit in which plural pixels each having a photoelectric conversion element which converts light signals into electric signals and accumulates the electric signals according to exposure time are arranged in a matrix state; plural control lines for drive controlling the pixels; and a pixel drive unit controlling operation of the pixels to perform electronic shutter operation and reading of the pixel unit through the control lines, wherein the pixel drive unit includes a function of outputting read row selection signals and shutter row selection signals of row addresses of read rows from which signals are read and shutter rows from which charges accumulated in the photoelectric conversion elements are swept out and reset in accordance with address signals, and a function of selecting plural successive rows by designating the lowest address signal and the highest address signal.

14 Claims, 16 Drawing Sheets

110A

SOLID-STATE IMAGING DEVICE AND CAMERA SYSTEM THAT CONTROLS A UNIT OF PLURAL ROWS

BACKGROUND OF THE INVENTION

1. Field of the Invention

The present invention relates to a solid-state imaging device and a camera system.

2. Description of the Related Art

A CMOS (Complimentary Metal Oxide Semiconductor) image sensor (CIS) has a feature that read addresses can be set relatively freely with respect to a CCD (Charge Coupled Device) image sensor.

For example, a sensor having functions of "addition" which reads plural pixel signals at the same time, "thinning-out" which reads pixel signals intermittently while skipping rows and columns, "cut-out" which reads signals only from part of pixels instead of reading all pixels of the sensor is widely used.

"Addition", "thinning-out" and "cut-out" are occasionally performed at the same time.

As reading and shutter operations are complicated in the sensor having functions of "addition", "thinning-out" and "cut-out", a decoder is used for row selection instead of a shift register in many cases.

In the image sensor, a phenomenon called "blooming" is known, in which signal charges flow from a saturated photodiode (hereinafter, referred to as PD) to an adjacent PD and the signal amount varies.

Particularly in the "thinning-out" mode, blooming occurs unless charges accumulated in pixels not to be read are suitably swept out, which reduces image quality.

In response to the above, a method of suppressing blooming by releasing a shutter for sweeping out charges from pixels not to be read (blooming prevention shutter) is proposed (refer to JP-A-2008-193618 (Patent Document 1)).

In this method, plural rows are selected at the same time in the case in which the blooming prevention shutter is released at the time of operating "thinning-out" and in the case of operating "addition".

FIG. 1 is a view showing an example of addresses of read and shutter rows when two rows are "added" and half of rows is "thinned out".

At time "t5", row-addresses "n+9" and "n+11" are selected at the same time and added to be read.

Row addresses "n+17" and "n+19" are shutters for a reading frame, row addresses "n" and "n+2" are shutters for a next frame and row addresses "n+21", "n+23" and "n+4" and "n+6" are blooming prevention shutters.

In order to select plural rows as the above example, a row selection circuit in which address latches are provided at respective rows is proposed (refer to JP-A-2008-288903 (Patent Document 2)).

FIG. 2 is a diagram showing configurations of a row selection circuit and a row selection timing control circuit.

FIG. 3 is a view showing a timing chart of circuits of FIG. 2.

A circuit 1 of FIG. 2 is configured by including a latch circuit 2 and a row selection circuit 3.

The latch circuit 2 includes two SR latches LTC1, LTC 2 in each row.

The row selection circuit 3 includes 2-input AND gates AG1 to AG5 corresponding to outputs of the SR latches LTC1, LTC 2 of each row and 2-input OR gates OG1, OG2 performing OR operation of them.

In this configuration, the function of selecting arbitrary plural rows is realized by setting only latches of rows to be selected.

SUMMARY OF THE INVENTION

However, as it is necessary to write "1" in latches of rows to be selected one by one in the above configuration, there is a disadvantage that writing time to latches will be long when the number of rows to be selected at the same time.

Thus, it is desirable to provide a solid-state imaging device and a camera system capable of selecting plural rows at the same time in a short time.

According to an embodiment of the invention, there is provided a solid-state imaging device including a pixel unit in which plural pixels each having a photoelectric conversion element which converts light signals into electric signals and accumulates the electric signals according to exposure time are arranged in a matrix state, plural control lines for drive controlling the pixels, and a pixel drive unit controlling operation of the pixels to perform electronic shutter operation and reading of the pixel unit through the control lines, in which the pixel drive unit has a function of outputting read row selection signals and shutter row selection signals of row addresses of read rows from which signals are read and shutter rows from which charges accumulated in the photoelectric conversion elements are swept out and reset in accordance with address signals, and a function of selecting plural successive rows by designating the lowest address signal and the highest address signal.

According to an another embodiment of the invention, there is provided a camera system including a solid-state imaging device, an optical system focusing a subject image on the solid-state imaging device and a signal processing circuit processing output image signals from the solid-state imaging device, in which the solid-state imaging device has a pixel unit in which plural pixels each having a photoelectric conversion element which converts light signals into electric signals and accumulates the electric signals according to exposure time are arranged in a matrix state, plural control lines for drive controlling the pixels, and a pixel drive unit controlling operation of the pixels to perform electronic shutter operation and reading of the pixel unit through the control lines, in which the pixel drive unit has a function of outputting read row selection signals and shutter row selection signals of row addresses of read rows from which signals are read and shutter rows from which charges accumulated in the photoelectric conversion elements are swept out and reset in accordance with address signals, and a function of selecting plural successive rows by designating the lowest address signal and the highest address signal.

According to the embodiments of the invention, plural rows can be selected at the same time in a short time.

DESCRIPTION OF THE PREFERRED EMBODIMENTS

Hereinafter, embodiments of the invention will be explained with reference to the drawings.

1. First Embodiment (First configuration example of a CMOS image sensor (solid-state imaging device))

2. Second Embodiment (Second configuration example of the CMOS image sensor (solid-state imaging device))

3. Third Embodiment (Third configuration example of the CMOS image sensor (solid-state imaging device))

4. Fourth Embodiment (Configuration example of a camera system)<

<1. First Embodiment>

Figure 1:
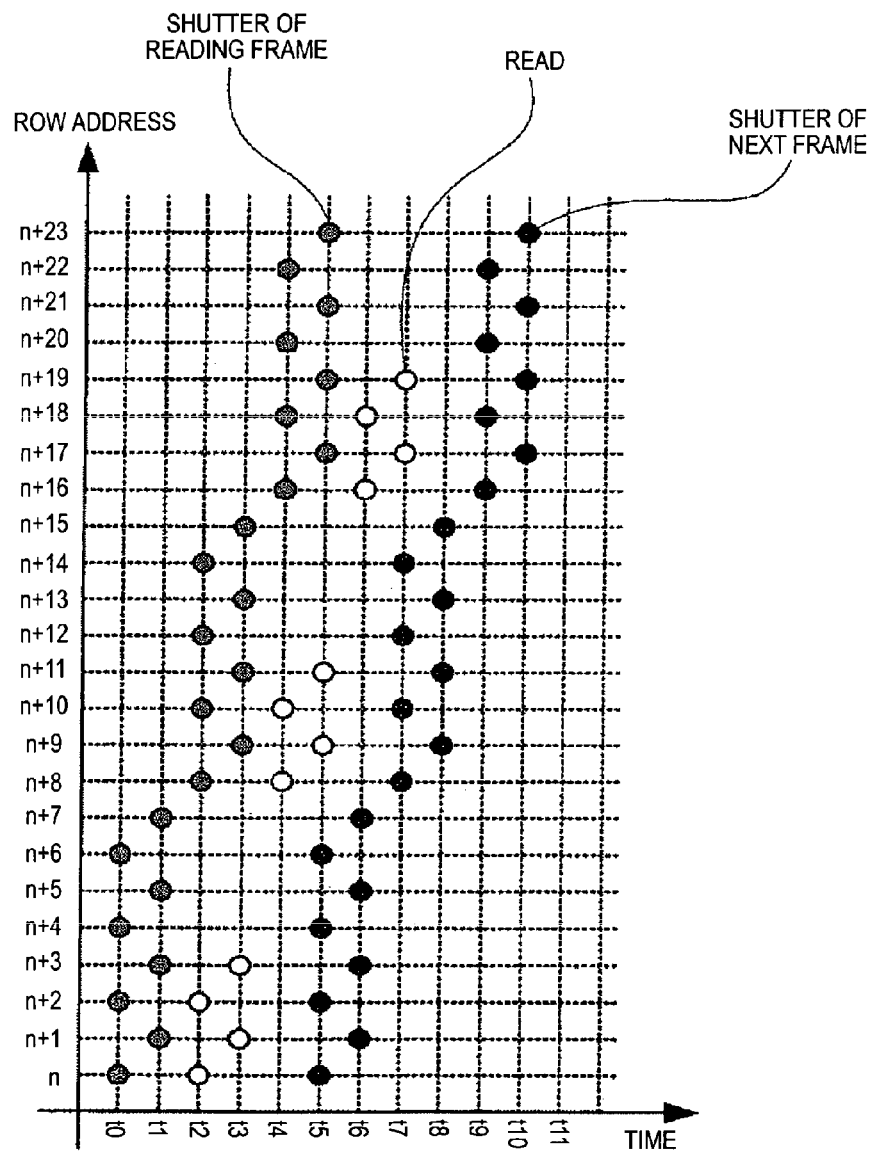
FIG. 1 is a view showing an example of addresses of read and shutter rows when two tows are "added" and half of rows are "thinned-out"
Figure 2:
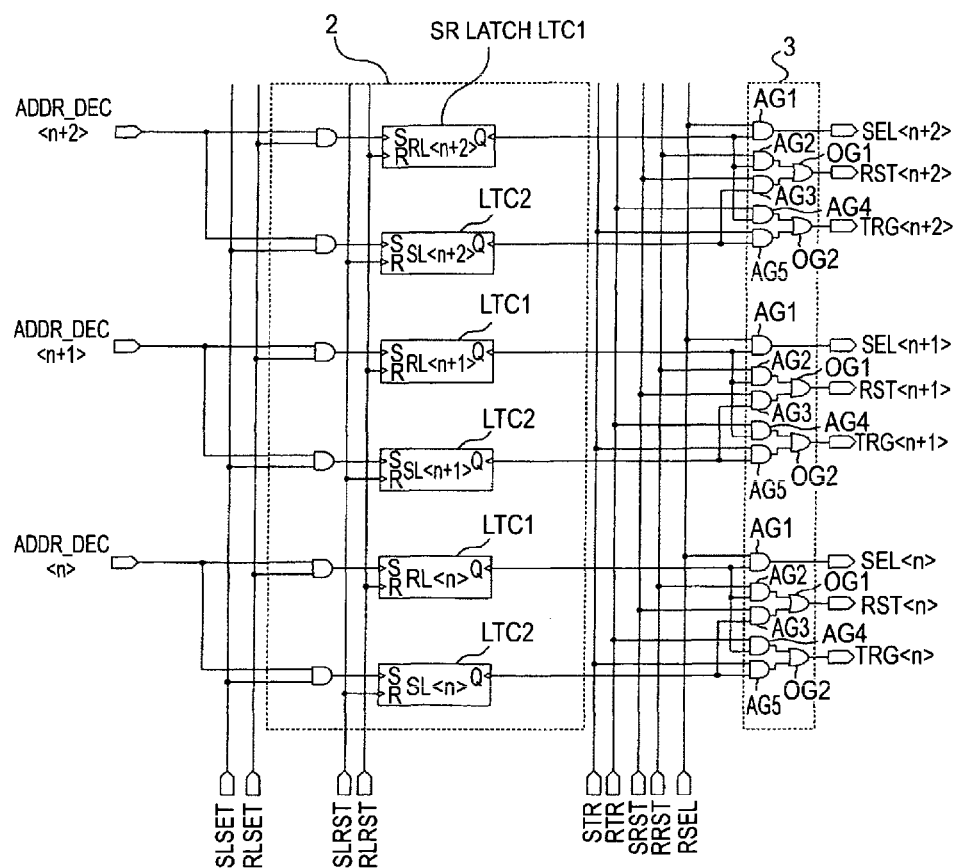
FIG. 2 is a diagram showing configurations of a row selection circuit and a row selection timing control circuit.
Figure 3:
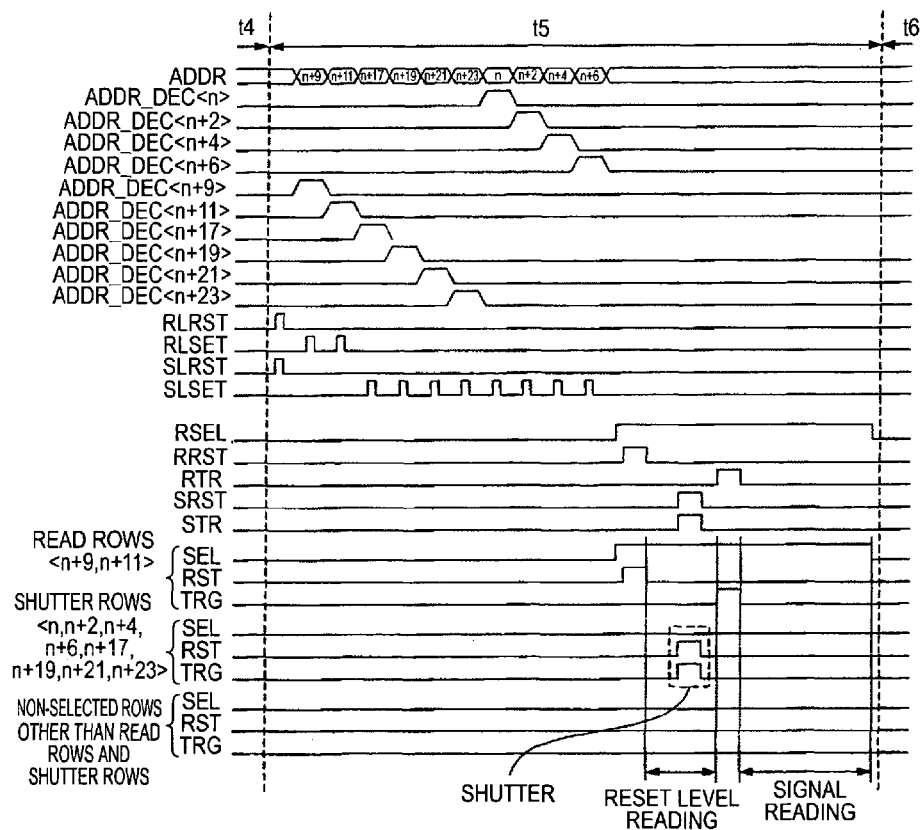
FIG. 3 is a view showing a timing chart of circuits of FIG. 2.
Figure 4:
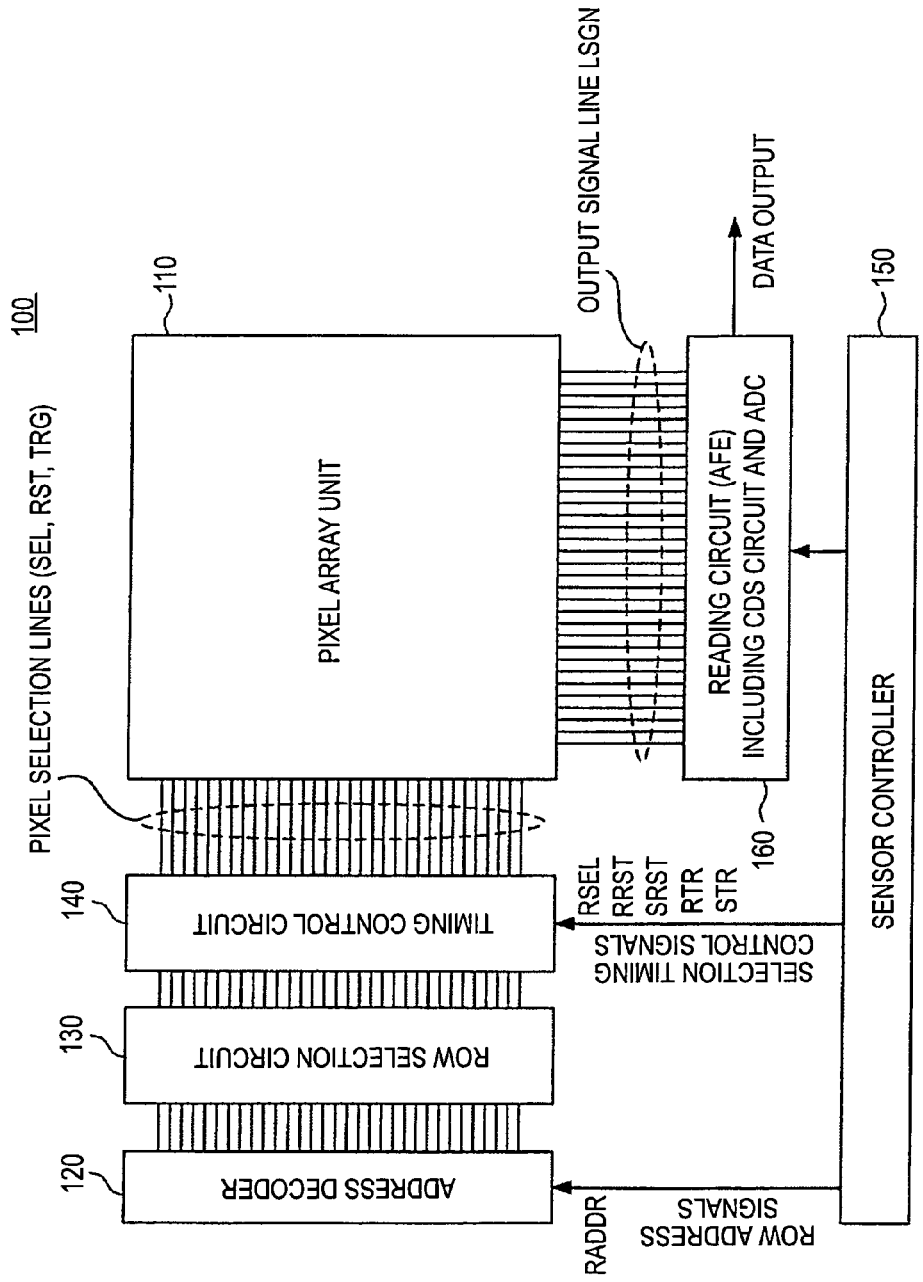
FIG. 4 is a diagram showing a configuration example of a CMOS image sensor (solid-state imaging device) according to a first embodiment of the invention.

FIG. 4 is a diagram showing a configuration example of a CMOS image sensor (solid-state imaging device) according to a first embodiment of the invention.

The CMOS image sensor 100 includes a pixel array unit 110, an address decoder 120, a row selection circuit 130 and a timing control circuit 140, a sensor controller 150 and a reading circuit (AFE) 160.

The address decoder 120, the row selection circuit 130, the timing control circuit 140 and the sensor controller 150 form a pixel drive unit.

In the pixel array unit 110, plural pixel circuits are arranged in a two-dimensional state (matrix state) of M rows×N columns.

Figure 5:
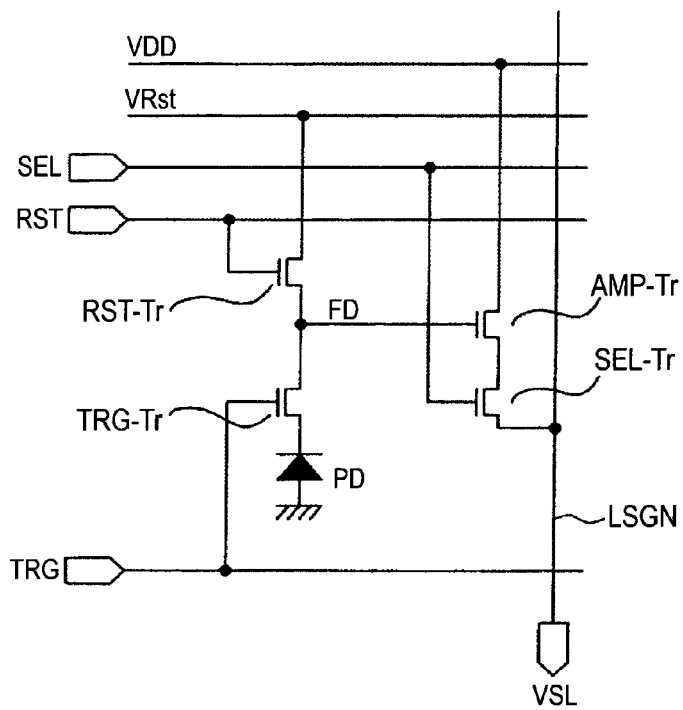
FIG. 5 is a diagram showing an example of a pixel circuit according to the embodiment.

FIG. 5 is a circuit diagram showing an example of a pixel circuit according to the embodiment.

A pixel circuit 110A includes a photoelectric conversion element (also referred to as merely PD in the following description) made of, for example, a photodiode (PD).

Each one photoelectric conversion element PD has a transfer transistor TRG-Tr, a reset transistor RST-Tr, an amplifier transistor AMP-Tr and a selection transistor SEL-Tr respectively.

The photoelectric conversion element PD generates an amount of signal charges (electrons in this case) corresponding to an amount of incident light and accumulates the signal charges.

Hereinafter, a case in which signal charges are electrons and respective transistors are n-type transistors will be explained, however, signal charges may be holes and respective transistors may be p-type transistors.

The embodiment may be effective also in the case that respective transistors are shared among plural photoelectric conversion elements and in the case that three-transistor (3Tr) pixel not having the selection transistor is applied.

The transfer transistor TRG-Tr is connected between the photoelectric conversion element PD and a FD (floating Diffusion), which is controlled through a control line TRG.

The transfer transistor TRG-Tr is selected and is in a conductive state during a period in which the control line TRG is in a high level (H), which transfers electrons photoelectrrically converted in the photoelectric conversion element PD to the FD.

The reset transistor RST-Tr is connected between a power supply line VRst and the FD, which is controlled through a control line RST.

The reset transistor RST-Tr is selected and is in conductive state during a period in which the control line RST is in a high level (H), which resets the FD to a potential of the power supply line VRst.

The amplifier transistor AMP-Tr and the selection transistor SEL-Tr are connected in series between a power supply line VDD and an output signal line VSL.

The FD is connected to a gate of the amplifier transistor AMP-Tr, and the selection transistor SEL-Tr is controlled through a control line SEL.

The selection transistor SEL-Tr is selected and is in a conductive state during a period in which the control line SEL is in the high level (H). Accordingly, the amplifier transistor AMP-Tr outputs a signal VSL corresponding to the potential of the FD to an output signal line LSGN.

As M rows×N columns of the pixel circuits 110A are arranged in the pixel array unit 110, there are M-pieces of the control lines SEL, RST, TRG respectively and there are N-pieces of the output signal lines LSGN for the signals VSL.

The address decoder 120 decodes row address signals RADDR from the sensor controller 150 and selects particular rows.

The row selection circuit 130 outputs row selection signals RLSEL, SLSEL of row addresses of read rows from which signals are read and shutter rows from which charges accumulated in the photoelectric conversion elements PD are swept out and reset in accordance with address signals ADDR from the address decoder 120.

According to the embodiment, lowest addresses R_ADDR_L_DEC, S_ADDR1_L_DEC, S_ADDR2_L_DEC and highest addresses R_ADDR_H, S_ADDR1_H, S_ADDR2_H are designated with respect to the row selection circuit 130, thereby selecting plural successive rows by the row selection circuit 130.

The timing control circuit 140 controls part or all of the control lines SEL, RST, TRG which are respective M-pieces of pixel selection lines to be in the H level in accordance with selection timing control signals from the sensor controller 150 and row selection signals RLSEL, SLSEL from the row selection circuit 130.

The selection timing control signals include signals RSEL, RRST, SRST, RTR and STR.

The sensor controller 150 controls the timing control circuit 140, the address decoder 120 and the reading circuit (AFE) 160 with proper timing.

The reading circuit (AFE) 160 reads the signals VSL outputted in the output signal lines LSGN in accordance with the control signal from the sensor controller 150 and outputs the signals to the outside.

The reading circuit 160 performs given processing with respect to the signals VSL outputted through the output signal lines LSGN from respective pixel circuits 110A of the reading rows selected by drive of the row selection circuit 130, and, for example, stores the pixel signals after signal processing temporarily.

The reading circuit 160 may apply, for example, a circuit configuration including a sample and hold circuit which samples and holds signals outputted through the output signal lines LSGN.

Additionally, the reading circuit 160 may apply a circuit configuration of including the sample and hold circuit and a function of removing fixed pattern noise peculiar to the pixel such as reset noise and threshold variation of the amplifier transistor by CDS (Correlated Double Sampling) processing.

Furthermore, the reading circuit 160 may apply a configuration including an analog/digital (AD) conversion function to allow the signal level to be a digital signal.

In the embodiment, color filters may have regular arrangement with respect to one row to several rows.

Figure 6:
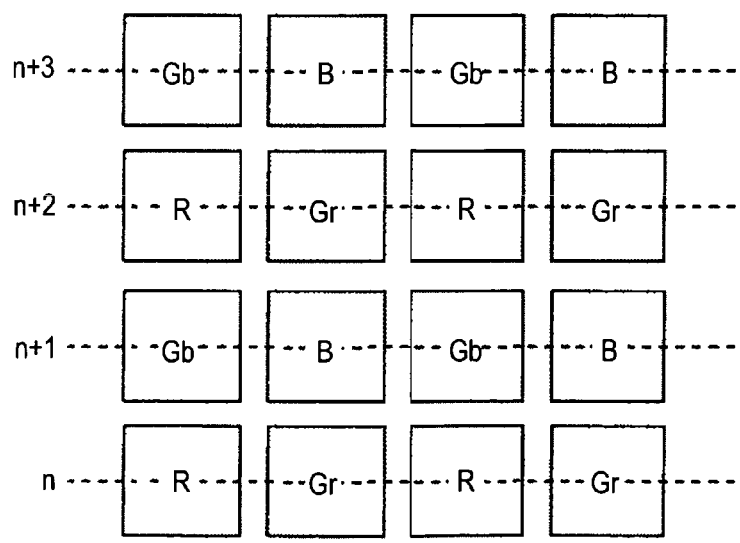
FIG. 6 is a view showing commonly-used Bayer arrangement.

Hereinafter, commonly-used Bayer arrangement shown in FIG. 6 will be explained as an example.

In the Bayer arrangement, pixels of the same color are alternately arranged in a cyclic manner. For example, when R/Gr pixels are arranged at 0th row, R/Gr pixels are arranged also in the "2n"th ("n" is an arbitrary integer) row.

When plural rows are sequentially selected to read "added" pixels and perform shutter operation, plural successive pixels of the same color will be selected.

Additionally, for example, as described in Patent Document 1, generation of blooming can be suppressed by adding the blooming prevention shutter with respect to the adjacent same color pixels when performing shutter operation.

Accordingly, it is desirable to select plural rows at the same time in pairs of rows in the case that the pixels of the same color are alternately arranged as in Bayer arrangement.

Figure 7:
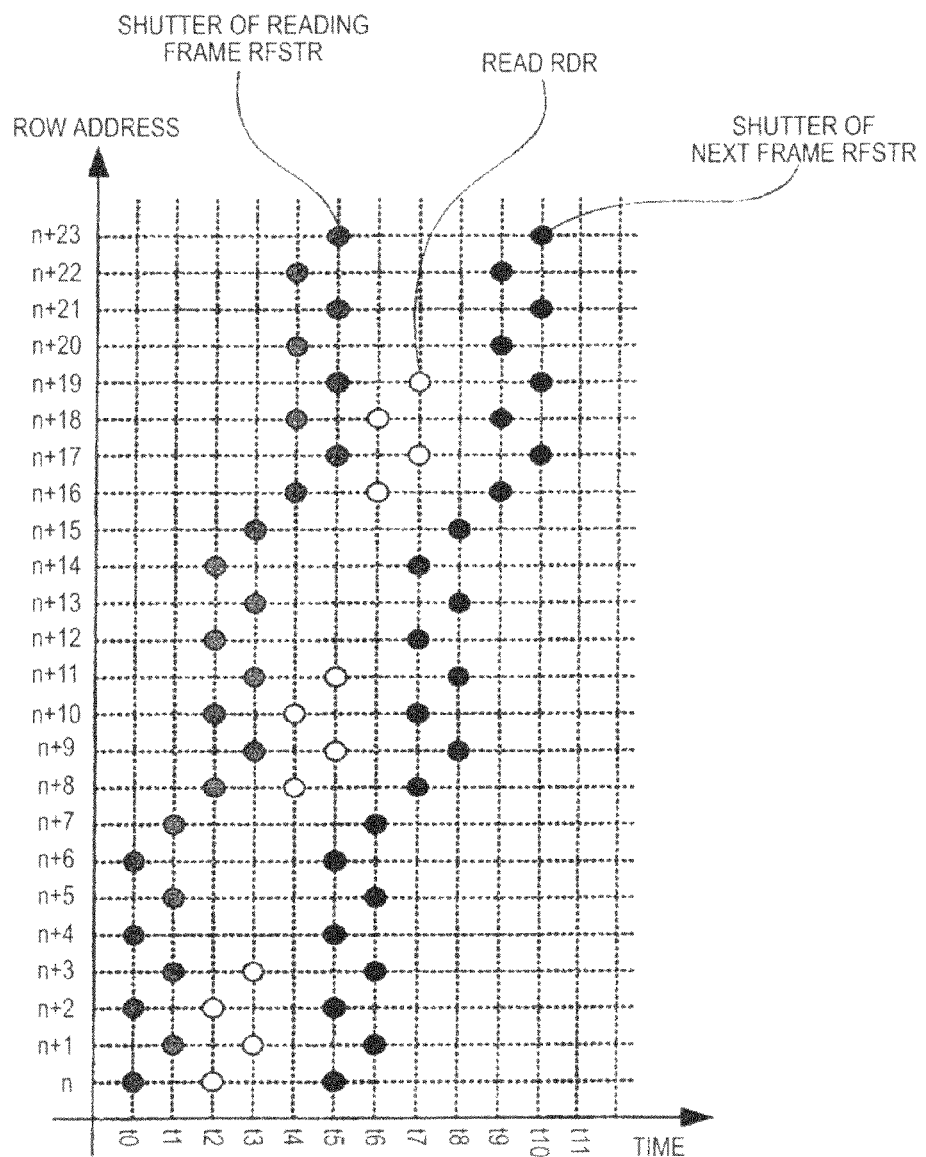
FIG. 7 is an explanatory view of reading and shutters of pixel signals according to the embodiment.

FIG. 7 is an explanatory view of reading and shutters of pixel signals according to the embodiment.

FIG. 7 shows a case of "two-pixel addition", in which two pixels are added and read at the same time.

The drawing also shows a case in which "½ thinning-out", in which half of pixels is thinned out.

In FIG. 7, the horizontal axis indicates time and the vertical axis indicates row addresses of the pixel array. A unit of time is a horizontal reading period (H).

In the drawing, rows shown by white spots denote read rows RDR, rows shown by black spots denote shutter rows of a next frame NFSTR and rows shown by spots with hatching denote shutter rows during reading RFSTR, and operations shown in FIG. 7 will be respectively performed.

For example, at time "t5", row addresses "n+9" and "n+11" are selected as read rows RDR at the same time and added them to be read.

The shutter operation is performed at row addresses "n+17", "n+19", "n+21", "n+23", "n", "n+2", "n+4" and "n+6".

The row addresses "n+17" and "n+19" are shutters with respect to a frame during reading, and the row addresses "n", "n+2" are shutters with respect to the next frame.

The row addresses "n+21", "n+23" and "n+4", "n+6" are blooming prevention shutters with respect to thinned-out rows.

More specific configurations and functions of the address decoder 120, the row selection circuit 130 and the timing control circuit 140 according to the embodiment will be explained as follows.

To the address decoder 120 according to the embodiment, six systems of row address signals R_ADDR_L, R_ADDR_H, S_ADDR1_L, S_ADDR1_H, S_ADDR2_L AND S_ADDR2_H are inputted from the sensor controller 150.

R_ADDR_L indicates a lowest address signal of the read row and the R_ADDR_H indicates a highest address signal of the read row respectively.

S_ADDR1_L indicates a lowest address signal of the shutter row of the frame during reading and S_ADDR1_H indicates a highest address signal of the shutter row of the frame during reading respectively.

S_ADDR2_L indicates a lowest address signal of the shutter row of the next frame and S_ADDR2_H indicates a highest address signal of the shutter row of the next frame respectively.

The address decoder 120 decodes these address signals and outputs row-address decoded signals corresponding to respective rows.

The address decoder 120 decodes the lowest address signal of the read row R_ADDR_L and output a lowest address decoded signal of the read row R_ADDR_L_DEC to the row selection circuit 130.

The address decoder 120 decodes the highest address signal of the read row R_ADDR_H and output a highest address decoded signal of the read row R_ADDR_H_DEC to the row selection circuit 130.

The address decoder 120 decodes the lowest address signal of the shutter row of the frame during reading S_ADDR1_L and outputs a lowest address decoded signal of the shutter row of the frame during reading S_ADDR1_L_DEC to the row selection circuit 130.

The address decoder 120 decodes the highest address signal of the shutter row of the frame during reading S_ADDR1_H and outputs a highest address decoded signal of the shutter row of the frame during reading S_ADDR1_H_DEC to the row selection circuit 130.

The address decoder 120 decodes the lowest address signal of the shutter row of the next frame S_ADDR2_L and outputs a lowest address decoded signal of the shutter row of the next frame S_ADDR2_L_DEC to the row selection circuit 130.

The address decoder 120 decodes the highest address signal of the shutter row of the next frame S_ADDR2_H and outputs a highest address decoded signal of the shutter row of the next frame S_ADDR2_H_DEC to the row selection circuit 130.

M-pieces of address decoded signals R_ADDR_L_DEC, R_ADDR_H_DEC, S_ADDR1_L_DEC, S_ADDR1_H_DEC, S_ADDR2_L_DEC and S_ADDR2_H_DEC are provided respectively.

For example, in the case that M is 2048 and R_ADDR_L is 11'h010, only R_ADDR_L_DEC<16> is selected and allowed to be H in the address decoded signals R_ADDR_L_DEC<0> to R_ADDR_L_DEC<M−1> and others will be L.

The row selection circuit 130 selects any or all of M-pieces of read row selection signals RLSEL and M-pieces of shutter row selection signals SLSEL in accordance with the address decoded signal obtained by decoding the row address signal from the address decoder 120.

The decoded address signals include above address signals R_ADDR_L_DEC, R_ADDR_H_DEC, S_ADDR1_L_DEC, S_ADDR1_H_DEC, S_ADDR2_L_DEC and S_ADDR2_H_DEC.

The row selection circuit 130 according to the embodiment selects rows from the row designated by the lowest address decoded signal of the read row R_ADDR_L_DEC to the row designated by the highest address decoded row of the read row R_ADDR_H_DEC in pairs of rows.

Similarly, the row selection circuit 130 selects the following rows in pairs of rows.

First, the row selection circuit 130 selects rows from the row designated by the lowest address decoded signal of the shutter row of the reading frame S_ADDR1_L_DEC to the row designated by the highest address decoded signal of the shutter row of the reading frame S_ADDR1_H_DEC.

Second, the row selection circuit 130 selects rows from the row designated by the lowest address decoded signal of the shutter row of the next frame S_ADDR2_L_DEC to the row designated by the highest address decoded signal of the shutter row of the next frame S_ADDR2_H_DEC.

The above rows are selected in pairs of rows.

For example, when the address decoded signals R_ADDR_L_DEC<n> and R_ADDR_H_DEC<n+6> are H, only RLSEL<n>, RLSEL<n+2>, RLSEL<n+4> and RLSEL<n+6> are selected to be H in the read row selection signals.

Figure 8:
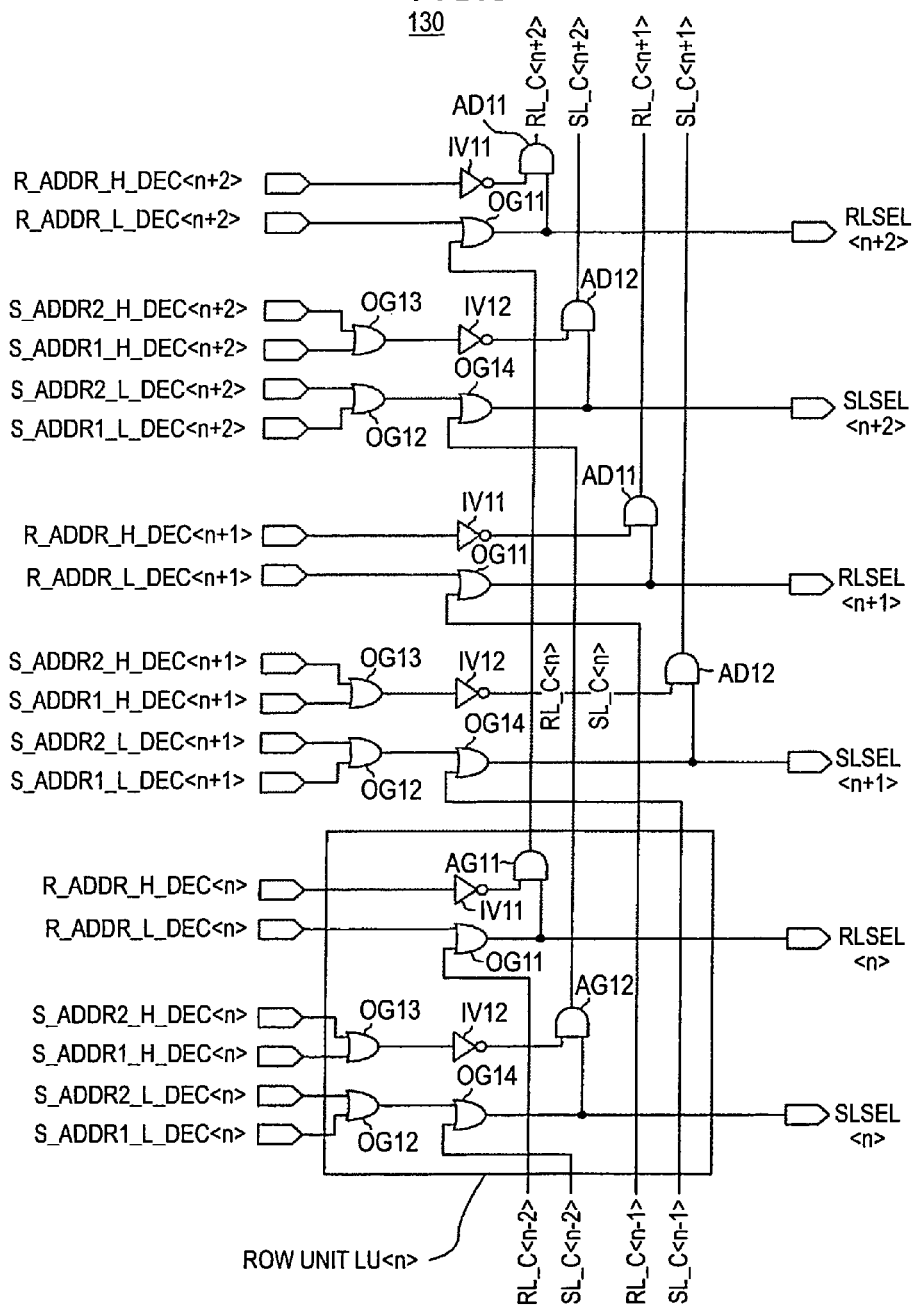
FIG. 8 is a circuit diagram showing a configuration example of a row selection circuit according to the first embodiment.

FIG. 8 is a circuit diagram showing a configuration example of the row selection circuit according to the embodiment.

FIG. 8 shows only a part in which the "n"th to "n+2"th rows are selected in the pixel array unit 110.

The row selection circuit 130 includes row units LU equivalent to the number of rows (M-pieces) of the pixel array unit 110. In the embodiment, the function of selecting plural rows at the same time in pairs of rows is realized by connecting the row units LU in pairs of rows.

The row unit LU<n> includes 2-input OR gates OG11 to OG14, two-input AND gates AG11, AG12 and inverters IV11, IV12.

Other row units LU<n+1>, LU<n+2> . . . also have the same configuration as the row unit LU<n>.

A first input terminal of the OR gate OG11 is connected to a supply line of the lowest address decoded signal R_ADDR_L_DEC<n> of the read row.

A second input terminal of the OR gate OG11 is connected to a supply line of a carry signal RL_C<n−2> of the AND gate AG11 of the row unit LU<n−2> which is a stage two rows previous to the row unit LU<n>.

An output terminal of the OR gate OG11 is connected to a first input terminal of a first input terminal of the AND gate AG11, and the read row selection signal RLSEL<n> is outputted from the output terminal of the OR gate OG11.

A second input terminal of the AND gate AG11 is connected to an output terminal of the inverter IV11, and an input terminal of the inverter IV11 is connected to a supply line of the highest address decoded signal R_ADDR_H_DEC<n>.

An output terminal of the AND gate AG11 is connected to a second input terminal of the OR gate OG11 of the row unit LU<n+2> which is a stage two rows subsequent to the row unit LU<n+2> as a supply line of a carry signal to an adjacent row RL_C<n>.

A first input terminal of the OR gate OG12 is connected to a supply line of the lowest address decoded signal of the shutter row of the reading frame S_ADDR1_L_DEC<n>.

A second input terminal of the OR gate OG12 is connected to a supply line of the lowest address decoded signal of the shutter row of the next frame S_ADDR2_L_DEC<n>. An output terminal of the OR gate OG12 is connected to a first input terminal of the OR gate OG14.

A second input terminal of the OR gate OG14 is connected to a supply line of a carry signal SL_C<n−2> of the AND gate AG12 of the row unit LU<n−2> which is the stage two rows previous to the row unit LU<n>.

An output terminal of the OR gate OG14 is connected to a first input terminal of the AND gate AG12, and the shutter row selection signal SLSEL<n> is outputted from the output terminal of the OR gate OG14.

A first input terminal of the OR gate OG13 is connected to the highest address decoded signal of the shutter row of the reading frame S_ADDR1_H_DEC<n>.

A second input terminal of the OR gate OG13 is connected to the highest address decoded signal of the shutter row of the next frame S_ADDR2_H_DEC<n>.

An output terminal of the OR gate OG13 is connected to an input terminal of the inverter IV12 and an output terminal of the inverter IV12 is connected to a second input terminal of the AND gate AG12.

An output terminal of the AND gate AG12 is connected to a second input terminal of the OR gate OG14 of the row unit LU<n+2> which is the stage two rows subsequent to the row unit LU<n> as a supply line of a carry signal to an adjacent row SL_C<n>.

In the row selection circuit 130 having the above configuration, the address decoded signals R_ADDR_L_DEC<n>, R_ADDR_H_DEC<n> from the address decoder 120 are inputted to the row unit LU<n> of the "n"th row.

To the row unit LU<n> of the "n"th row, the address decoded signal S_ADDR1_L_DEC<n>, S_ADDR1_H_DEC<n>, S_ADDR2_L_DEC<n> and S_ADDR2_H_DEC<n> from the address decoder 120 are inputted.

To the row unit LU<n> of the "n"th row, the carry signals from adjacent row RL_C<n−2> and SL_C<n−2> are inputted.

Then, the row unit LU<n> of the "n"th row outputs the row selection signals RLSEL<n>, SLSEL<n> and the carry signals to the adjacent row RL_C<n>, SL_C<n>.

The row unit LU<n> allows the read row selection signal RLSEl<n> to be H and selects the signal when the lowest address decoded signal of the read row R_ADDR_L_DEC<n> is H or when the carry signal of the read row RL_C<n−2> is H.

Additionally, the read row unit LU<n> allows the carry signal RL_C<n> to the adjacent row to be H when the read row selection signal RLSEL<n> is H and the highest address decoded signal of the read row R_ADDR_H_DEC<n> is in the low level (L).

Accordingly, the read row selection signal of "n+2"th row RLSEL<n+2> is also allowed to be H and selected.

On the other hand, in the case that the highest address decoded signal of the read row R_ADDR_H_DEC<n> is H, the carry signal RL_C<n> is L even when the read row selection signal RLSEL<n> is H. As a result, the read row selection signal RLSEL<n+2> of "n+2"th row is allowed to be L and is not selected.

The row unit LU<n> further allows the shutter row selection signal SLSEL<n> to be H and selects the signal when one of the following two states is satisfied.

First, the shutter row selection signal SLSEL<n> is selected when the lowest address decoded signal of the shutter row of the reading frame S_ADDR1_L_DEC<n> or the lowest address decoded signal of the shutter row of the next frame S_ADDR2_L_DEC<n> is H.

Second, the shutter row selection signal SLSEL<n> is selected when the carry signal SL_C<n−2> of the shutter row is H.

As described above, the row unit LU<n> allows the shutter row selection signal SLSEL<n> to be H and selects the signal in the case that any of the above two states is satisfied.

The row unit LU<n> allows the carry signal to the adjacent row SL_C<n> to be H when the following two states are satisfied.

First, the carry signal SL_C<n> is allowed to be H when the shutter row selection signal SLSEL<n> is H.

Second, the carry signal SL_C<n> is allowed to be H when the highest address decoded signal of the shutter row of the reading frame S_ADDR1_H_DEC<n> or the highest address decoded signal of the shutter row of the next frame S_ADDR2_H_DEC<n> is L.

As described above, the row unit LU<n> allows the carry signal to the adjacent row SL_C<n> to be H when the above both two states are satisfied.

Accordingly, the shutter row selection signal SLSEL<n+2> of the "n+2"th row is also allowed to be H and selected.

On the other hand, when the highest address decoded signal of the shutter row of the reading frame S_ADDR1_H_DEC<n> or the highest address decoded signal of the shutter row of the next frame S_ADDR2_H_DEC<n> is H, the following occurs.

That is, in the above case, the row unit LU<n> allows the read row selection signal RLSEL<n+2> of the "n+2"th row to be L and does not select the signal even when the read row selection signal RLSEL<n> is H, because the carry signal to the adjacent row RL_C<n> is L.

The timing control circuit 140 receives the selection timing control signals from the sensor controller 150 and the row selection signals from the row selection circuit 130 and outputs drive signals of the control lines SEL, RST and TRG.

Figure 9:
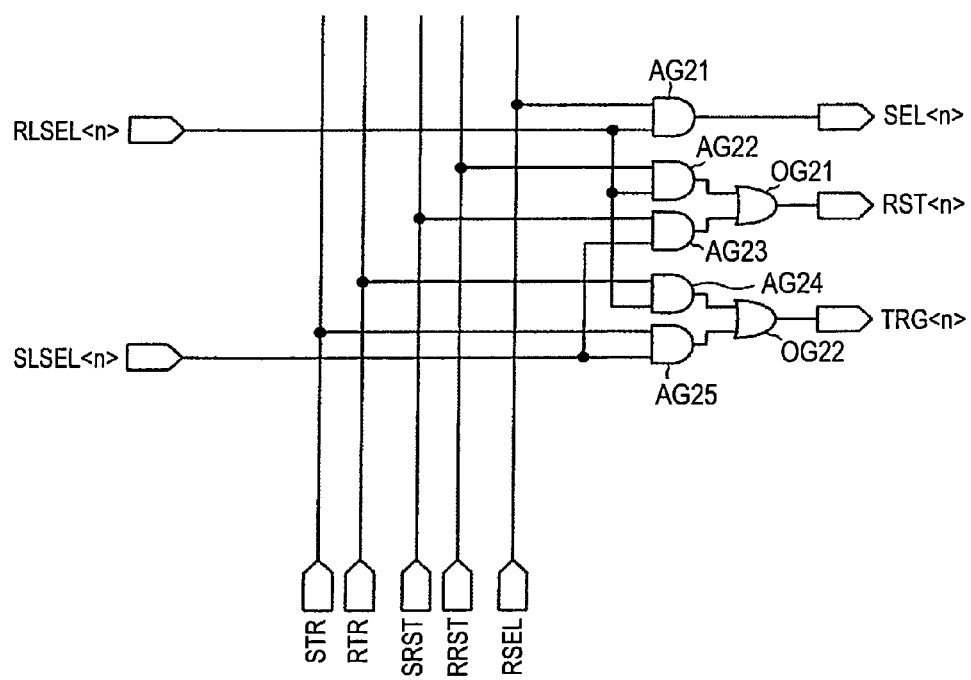
FIG. 9 is a circuit diagram showing a configuration example of a timing control circuit according to the embodiment.

FIG. 9 is a circuit diagram showing a configuration example of the timing control circuit according to the embodiment.

FIG. 9 shows only a part in which the "n"th row of the pixel array unit 110 is selected.

In the embodiment, the case in which the signal level is H (high level) is regarded as active and the case in which the signal level is L (low level) is regarded as inactive.

The timing control circuit 140 of FIG. 9 includes two-input AND gates AG21 to AG25 and two-input OR gate OG21, OG22.

A first input terminal of the AND gate AG21 is connected to a supply line of the selection timing control signal RSEL and a second, input terminal is connected to a supply line of the read row selection signal RLSEL<n>.

An output terminal of the AND gate AG21 is connected to the control line SEL<n>. That is, an output signal of the AND gate AG21 is outputted to the control line SEL<n> as a selection drive signal.

A first input terminal of the AND gate AG22 is connected to a supply line of the selection timing control signal RRST and a second input terminal is connected to a supply line of the read row selection signal RLSEL<n> by the row selection circuit 130.

An output terminal of the AND gate AG22 is connected to a first input terminal of the OR gate OG21.

A first input terminal of the AND gate AG 23 is connected to a supply line of the selection timing control signal SRST and a second input terminal is connected to a supply line of the shutter row selection signal SLSEL<n> by the row selection circuit 130.

An output terminal of the AND gate AG23 is connected to a second input terminal of the OR gate OG21.

An output terminal of the OR gate OG21 is connected to the control line RST<n>. That is, an output signal of the OR gate OG21 is outputted to the control line RST<n> as a reset drive signal.

A first input terminal of the AND gate AG24 is connected to a supply line of the selection timing control signal RTR and a second input terminal is connected to a supply line of the read row selection signal RLSEL<n> by the row selection circuit 130.

An output terminal of the AND gate AG24 is connected to a first input terminal of the OR gate OG22.

A first input terminal of the AND gate AG25 is connected to a supply line of the selection timing control signal STR and a second input terminal is connected to a supply line of the shutter row selection signal SLSEL<n> by the row selection circuit 130.

An output terminal of the AND gate AG25 is connected to a second input terminal of the OR gate OG22.

An output terminal of the OR gate OG22 is connected to the control line TRG<n>. That is, an output signal of the OR gate OG22 is outputted to the control line TRG<n> as a transfer drive signal.

The selection timing control signals RSEL, RRST, SRST, RTR and STR are supplied to the timing control circuit 140 from the sensor controller 150.

The selection timing control signal RSEL controls a period in which the control line SEL of the read row is allowed to be H.

The selection timing control signal RRST controls a period in which the control line RST of the read row is allowed to be H.

The selection timing control signal SRST controls a period in which the control line RST of the shutter row is allowed to be H.

The selection timing control signal RTR controls a period in which the control line TRG of the read row is allowed to be H.

The selection timing control signal STR controls a period in which the control line TRG of the shutter row is allowed to be H.

The timing control circuit 140 allows the control line SEL<n> to be H when both the read row selection signal RLSEL<n> and the selection timing control signal RSEL are allowed to be H.

The timing control circuit 140 allows the control line RST<n> to be H when both the read row selection signal RLSEL<n> and the selection timing control signal RRST are allowed to be H, or when both the shutter row selection signal SLSEL<n> and the selection timing control signal SRST are allowed to be H.

Similarly, the timing control circuit 140 allows the control line TRG<n> to be H when both the read row selection signal RLSEL<n> and the selection timing control signal RTR are allowed to be H, or when both the shutter row selection signal SLSEL<n> and the selection timing control signal STR are allowed to be H.

Figure 10:
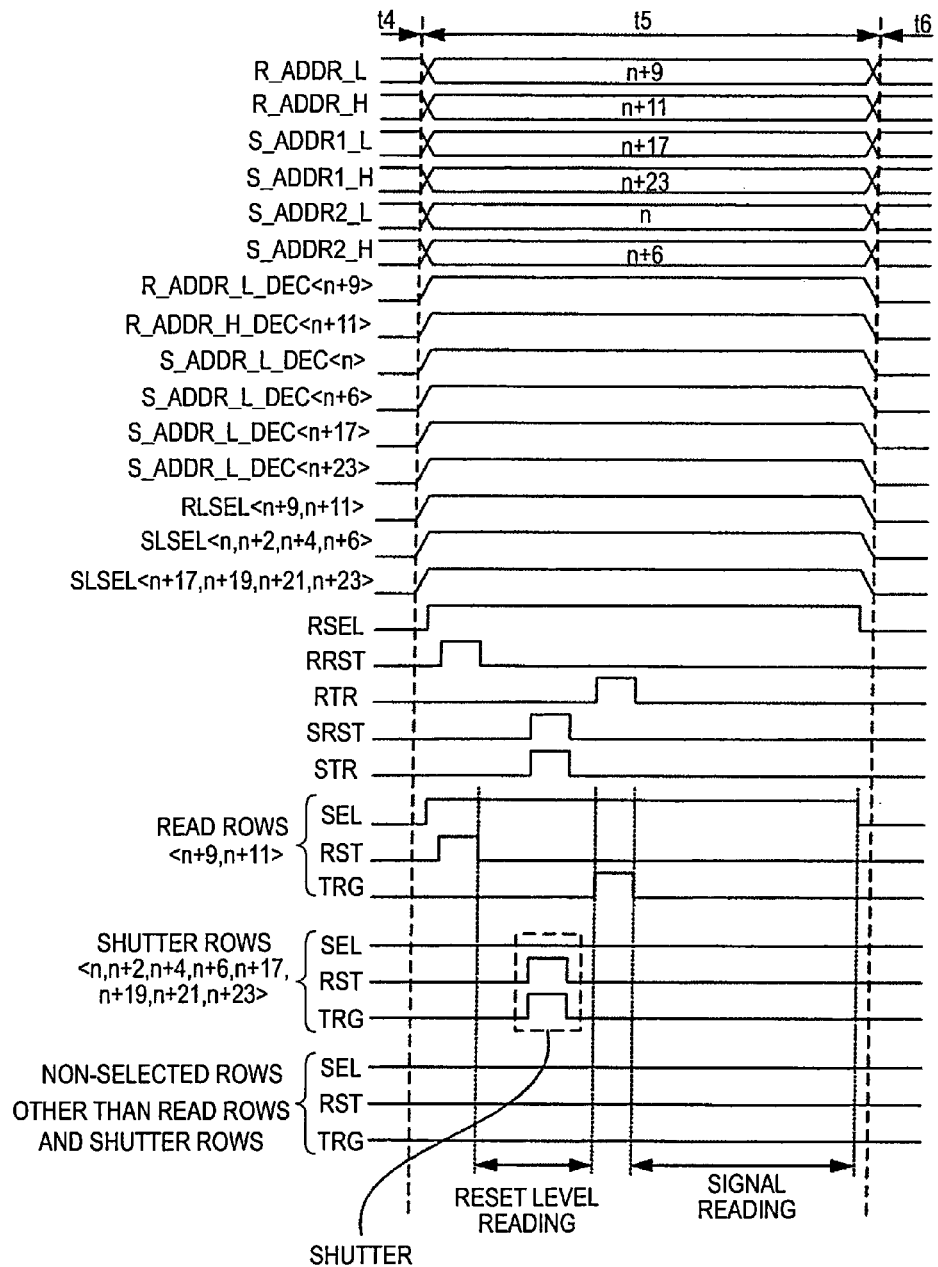
FIG. 10 is a view showing a timing chart of the row selection circuit according to the first embodiment.

FIG. 10 is a view showing a timing chart of the row selection circuit according to the first embodiment.

FIG. 10 is an example of the timing chart at the time (period) t5 of FIG. 7.

In the example of FIG. 10, the address signals R_AD-DR_L, R_ADDR_H, S_ADDR1_L, S_ADDR1_H, S_ADDR2_L and S_ADDR2_H from the sensor controller are fixed.

The row selection circuit 130 allows the read row selection signal RLSEL and the shutter row selection signal SLSEL corresponding to rows of the address signals to be H.

When the selection timing control signals RSEL, RRST, SRST, RTR and STR from the sensor controller 150 are inputted to the timing control circuit 140, the respective control lines SEL, RST and TRG are suitably selected.

In the example of FIG. 10, the shutter is released during the reset level reading period, however, the shutter may be released at any timing during the period t5.

The case in which addresses of the read rows, the shutter rows of the reading frame and the shutter rows of the next frame are provided as different signals has been explained as the above.

In such configuration, operation of reading, shutter of the reading frame and shutter of the next frame can be performed at the same time.

Conversely, it is also possible to use the address signals in common by separating these operations according to time.

For example, when reading operation and shutter operation are not performed at the same time, namely, when performing driving so that the selection timing control signals SRST and STR are not allowed to be H during a period in which RSEL, RRST or RTR is H, the following can be realized.

That is, the addresses of the read row and the shutter row of the reading frame or the shutter row of the next frame are allowed to be the common signal.

Similarly, it is also possible to allow shutter addresses of the reading frame and the next frame to be common by separating shutter timing between the reading frame and the next frame.

<2. Second Embodiment>

Figure 11:
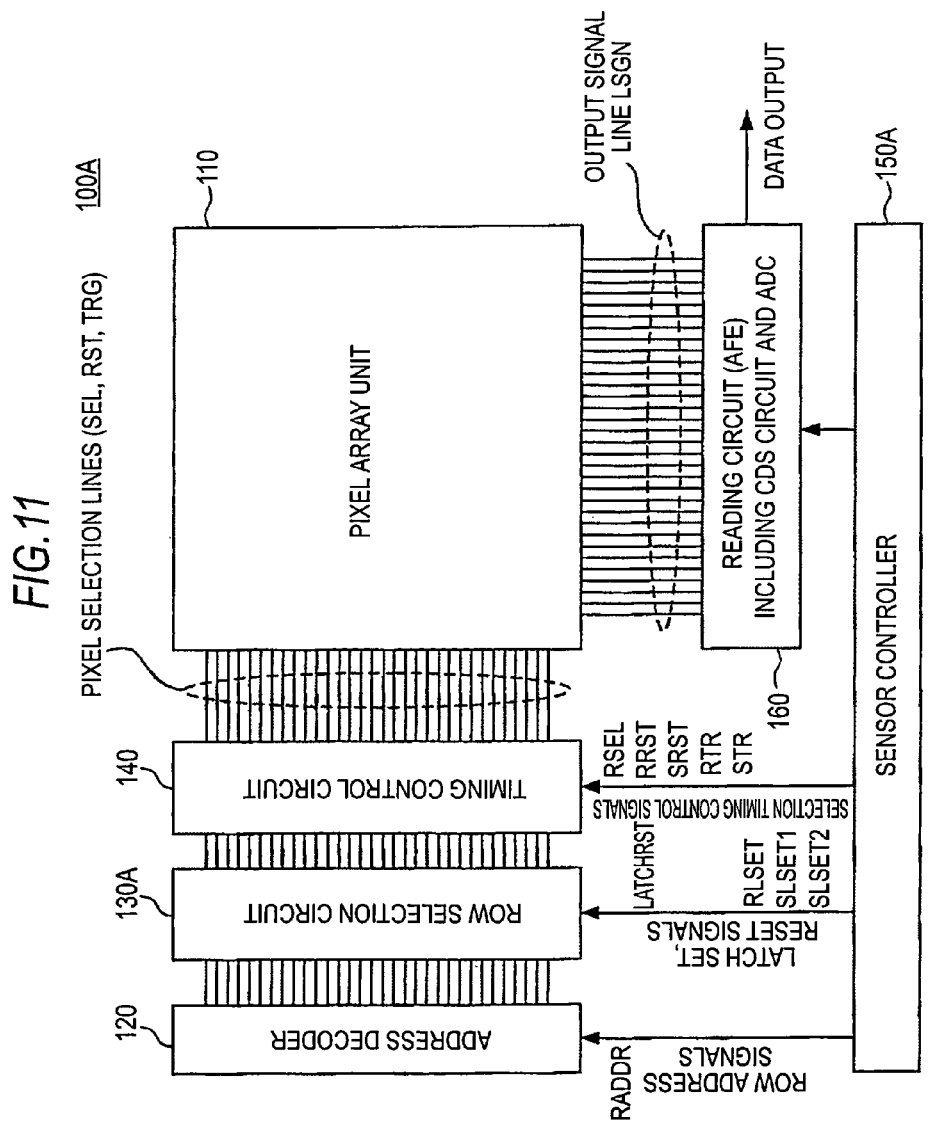
FIG. 11 is a diagram showing a configuration example of a CMOS image sensor according to a second embodiment of the invention.

FIG. 11 is a diagram showing a configuration example of a CMOS image sensor (solid-state imaging device) according to the second embodiment.

A CMOS image sensor 100A according to the second embodiment includes the pixel array unit 110, the address decoder 120 and a row selection circuit 130A for selecting pixels in the same manner as the first embodiment.

The CMOS image sensor 100A also includes the timing control circuit 140, a sensor controller 150A and the reading circuit (AFE) 160.

The configuration of the pixel array unit 110 and the pixel circuit 110A according to the second embodiment can apply the configuration of FIG. 5 in the same manner as the first embodiment.

The address decoder 120 according to the second embodiment decodes address signals ADDR from the sensor controller 150A and selects particular rows.

The row selection circuit 130A according to the second embodiment records row addresses of read rows and shutter rows in accordance with a latch set signal LSET and a reset signal LATCHRST and the address signals from the address decoder 120.

The timing control circuit 140 allows all or part of the respective M-pieces of control lines SEL, RST and TRG to be H in accordance with selection timing signals from the sensor controller 150A and the row addresses recorded in the row selection circuit 130A.

The sensor controller 150A according to the embodiment controls the row selection circuit 130A, the address decoder 120 and the reading circuit (AFE) 160 with proper timing.

The reading circuit (AFE) 160 according to the embodiment reads signals VSL outputted to the output signal lines LSGN in accordance with the control signal from the sensor controller 150A and outputs the signals to the outside.

The color filters may have regular arrangement with respect to one row to several rows in the same manner as the first embodiment.

Hereinafter, the case of Bayer arrangement shown in FIG. 6 will be explained.

The address signals ADDR are inputted to the address decoder 120 according to the second embodiment from the sensor controller 150A.

The address decoder 120 decodes the address signals ADDR and outputs address decoded signals ADDR_DEC of respective rows. M-pieces of address decoded signals ADDR_DEC are provided.

For example, when M is 2048 and ADDR is 11'h010, only ADDR_DEC<16> is allowed to be H in the address decoded signals, and other address decoded signals are allowed to be L.

Figure 12:
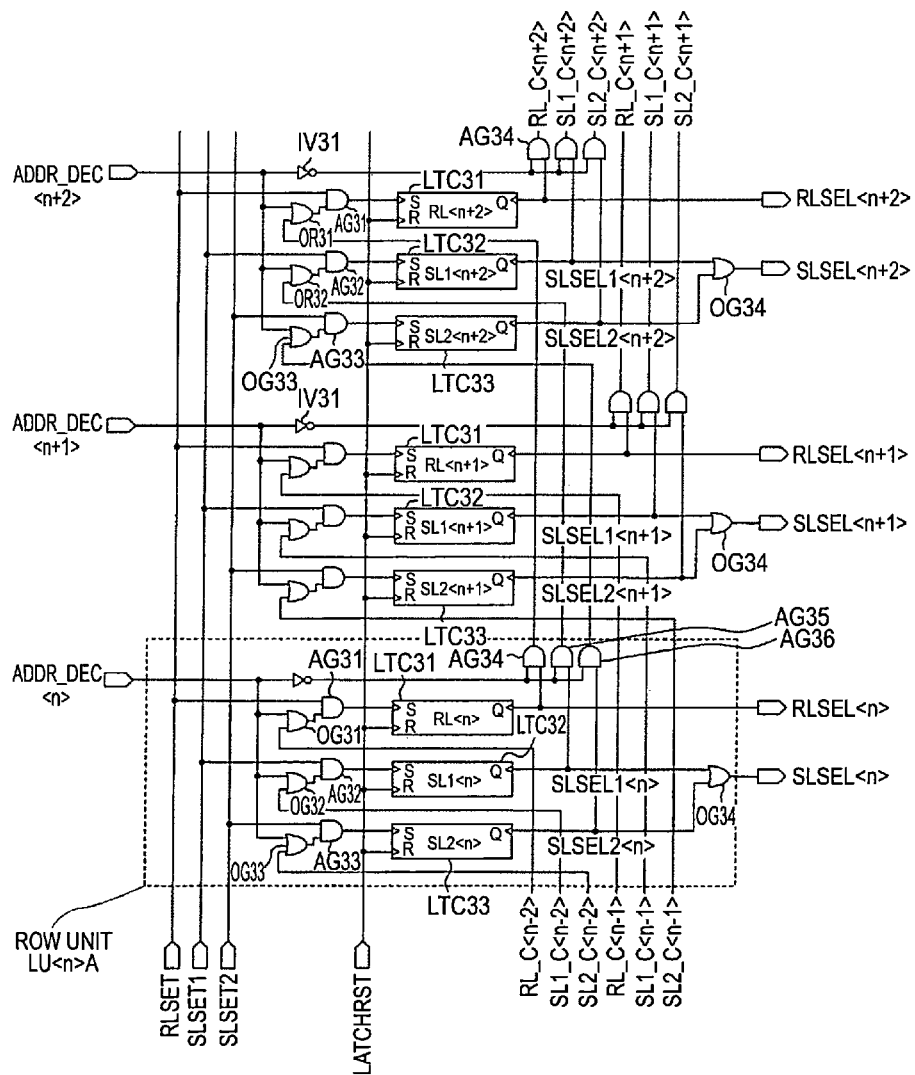
FIG. 12 is a circuit diagram showing a configuration example of the row selection circuit according to the second embodiment.

FIG. 12 is a circuit diagram showing a configuration example of the row selection circuit according to the second embodiment.

FIG. 12 shows only a part in which the "n"th to "n+2"th rows are selected in the pixel array unit 110.

The row selection circuit 130A of FIG. 12 includes two-input OR gates OG31 to OG34, two-input AND gates AG31 to AG36, an inverter IV31 and latches LTC31 to LTC33.

The latch LTC31 functions as a read latch RL, the latch LTC32 functions as a shutter latch SL1 and the latch LTC33 functions as a shutter latch SL2.

A first input terminal of the OR gate OG31 is connected to a supply line of the address decoded signal ADDR_DEC<n> by the address decoder 120.

A second input terminal of the OR gate OG31 is connected to a supply line of a carry signal RL_C<n−2> of the AND gate AG34 of a row unit LU<n−2>A which is a stage two rows previous to a row unit LU<n>A.

An output terminal of the OR gate OG31 is connected to a first input terminal of the AND gate AG31.

A first input terminal of the OR gate OG32 is connected to a supply line of the address decoded signal ADDR_DEC<n> by the address decoder 120.

A second input terminal of the OR gate OG32 is connected to a supply line of a carry signal SL1_C<n−2> of the AND gate AG35 of the row unit LU<n−2>A which is the stage two rows previous to the row unit LU<n>A.

An output input terminal of the OR gate OG32 is connected to a first input terminal of the AND gate AG32.

A first input terminal of the OR gate OG33 is connected to a supply line of the address decoded signal ADDR_DEC<n> by the address decoder 120.

A second input terminal of the OR gate OG33 is connected to a supply line of a carry signal SL2_C<n−2> of the AND gate AG36 of a row unit LU<n−2>A which is the stage two rows previous to the row unit LU<n>A.

An output input terminal of the OR gate OG33 is connected to a first input terminal of the AND gate AG33.

A second input terminal of the AND gate AG31 is connected to a supply line of a read latch set signal RLSET and an output terminal is connected to a set terminal S of the latch LTC31.

A second input terminal of the AND gate AG32 is connected to a supply line of a shutter latch set signal SLSET1 and an output terminal is connected to a set terminal S of the latch LTC32.

A second input terminal of the AND gate AG33 is connected to a supply line of a shutter latch set signal SLSET2 and an output terminal is connected to a set terminal S of the latch LTC33.

An input terminal of the inverter IV31 is connected to a supply line of the address decoded signal ADDR_DEC<n> and an output terminal is connected to first input terminal of the AND gates AG34 to AG36 in common.

Reset terminals R of the latches LTC31 to LTC33 are connected to a supply line of a latch reset signal LATCHRST in common.

An output terminal Q of the latch LTC31 is connected to a second input terminal of the AND gate AG34 and a read row selection signal RLSEL<n> is outputted from an output terminal of the latch LTC31.

An output terminal Q of the latch LTC32 is connected to a first input terminal of the OR gate OG34 and a second input terminal of the AND gate AG35.

An output terminal Q of the latch LTC33 is connected to a second input terminal of the OR gate OG34 and a second input terminal of the AND gate AG36.

Then, a shutter row selection signal SLSEL<n> is outputted from an output terminal of the OR gate OG34.

An output terminal of the AND gate AG34 is connected to a second input terminal of the OR gate OG31 of a row unit LU<n+2>A which is a stage two rows subsequent to the row unit LU<n>A as a supply line of a carry signal RL_C<n> to an adjacent row.

An output terminal of the AND gate AG35 is connected to a second input terminal of the OR gate OG32 of the row unit LU<n+2>A which is the stage two rows subsequent to the row unit LU<n>A as a supply line of a carry signal SL1_C<n> to an adjacent row.

An output terminal of the AND gate AG36 is connected to a second input terminal of the OR gate OG33 of the row unit LU<n+2>A which is a stage two rows subsequent to the row unit LU<n>A as a supply line of a carry signal SL2_C<n> to an adjacent row.

The latch reset signal LATCHRST, the read latch set signal RLSET and the shutter latch set signals SLSET1, SLSET2 are inputted to the row selection circuit 130A having the above configuration from the sensor controller 150A.

Furthermore, the address decoded signals ADDR_DEC are inputted from the address decoder 120.

The row selection circuit 130A also outputs the read row selection signals RLSEL and the shutter row selection signals SLSEL to the timing control circuit 140.

The row selection circuit 130A includes row units LU equivalent to the number of rows (M-pieces) of the pixel array unit 110.

The row unit LU<n>A arranged in "n"th row includes a read latch RL<n> indicating whether "n"th row is in the selected state as the read row or not, and shutter latches SL1<n>, SL2<n> indicating whether "n"th row is in the selected state as the shutter row or not.

In the example of FIG. 12, the read latch RL and the shutter latches SL1, SL2 are configured by a SR latch.

The row selection circuit 130A can record shutter addresses of two frames by including two systems of the shutter latches (SL1, SL2).

To the row unit LU<n>A of the "n"th row, the address decoded signal ADDR_DEC<c> from the address decoder 120, the carry signal RL_C<n−2>, SL1_C<n−2> and SL2_C<n−2> from the adjacent row are inputted.

The row unit LU<n>A outputs the row selection signals RLSEL<n>, SLSEL<n> and carry signals RL_C<n>, the SL1_C<n> and the SL2_C<n> to the adjacent row.

The latch reset signal LATCHRST, the read latch set signal RLSET and the shutter latch set signals SLSET1, SLSET2 are supplied to all row units LU.

The shutter latch SL1<n> outputs a row selection signal SLSEL1<n> and the shutter latch SL1<n> outputs a row selection signal SLSEL2<n>.

The shutter row selection signal SLSEL<n> is allowed to be H when the row selection signal SLSEL1<n> or SLSEL2<n> is H.

When the latch reset signal LATCHRST is allowed to be H, all read latches RL and shutter latches SL1, SL2 in the row selection circuit are reset, and all rows are allowed to be in the non-selected state.

The read latch RL<n> is set when the read latch set signal RLSET is H as well as the address decoded signal ADDR_DEC<n> or the carry signal RL_C<n−2> is H, outputting the read row selection signal RLSEL<n> in the H level.

The read latch RL<n> outputs the carry signal RL_C<n> to the adjacent row when the read row selection signal RLSEL<n> is H as well as the address decoded signal ADDR_DEC<n> is L.

The shutter latch SL1<n> sets when the shutter latch set signal SLSET1 is H as well as the address decoded signal ADDR_DEC<c> or the carry signal SL1_C<n−2> is H, outputting the shutter row selection signal SLSEL1<n> in the H level.

The shutter latch SL1<n> outputs the carry signal SL1_C<n> to the adjacent row in the H level when the shutter row selection signal SLSEL1<n> is H as well as the address decoded signal ADDR_DEC<n> is L.

The shutter latch SL2<n> is set when the shutter latch set signal SLSET2 is H as well as the address decoded signal ADDR_DEC<n> or the carry signal SL2_C<n−2> is H, outputting the shutter row selection signal SLSEL2<n> in the H level.

The shutter latch SL2<n> outputs the carry signal SL1_C<n> in the H level when the shutter row selection signal SLSEL2<n> is H as well as the address decoded signal ADDR_DEC<n> is L.

As described above, the carry signals are connected in pairs of rows to thereby select plural successive pixels in pairs of rows easily.

For example, when the read latches RL of rows desired to be selected are set, the latch reset signal LATCHRST is allowed to be H at first to reset all read latches RL.

In this state, the lowest address (ADDR_L) is outputted to the address signal ADDR to allow the read latch set signal RLSET to be H to set the read latch RL<ADDR_L> of the lowest address.

Next, the highest address (ADDR_H) is outputted to the address signal ADDR to allow the read latch set signal RLSET to be H.

Accordingly, the read latches RL<ADDR_L>, RL<ADDR_L+2>, ..., RL<ADDR_H−2>, RL<ADDR_H> from the lowest address to the highest address are set.

When plural rows are set in pairs of rows, it is necessary that ADDR_H is equal to ADDR_L+2m (m is an arbitrary integer).

Similarly, when the shutter latches SL1 or SL2 are set, it is possible to set the shutter latches SL1 or SL2 from the lowest address to the highest address in pairs of rows by setting the lowest address at first and the highest address is sequentially set.

The timing control circuit according to the second embodiment can apply the configuration of FIG. 9 in the same manner as the first embodiment.

Figure 13:
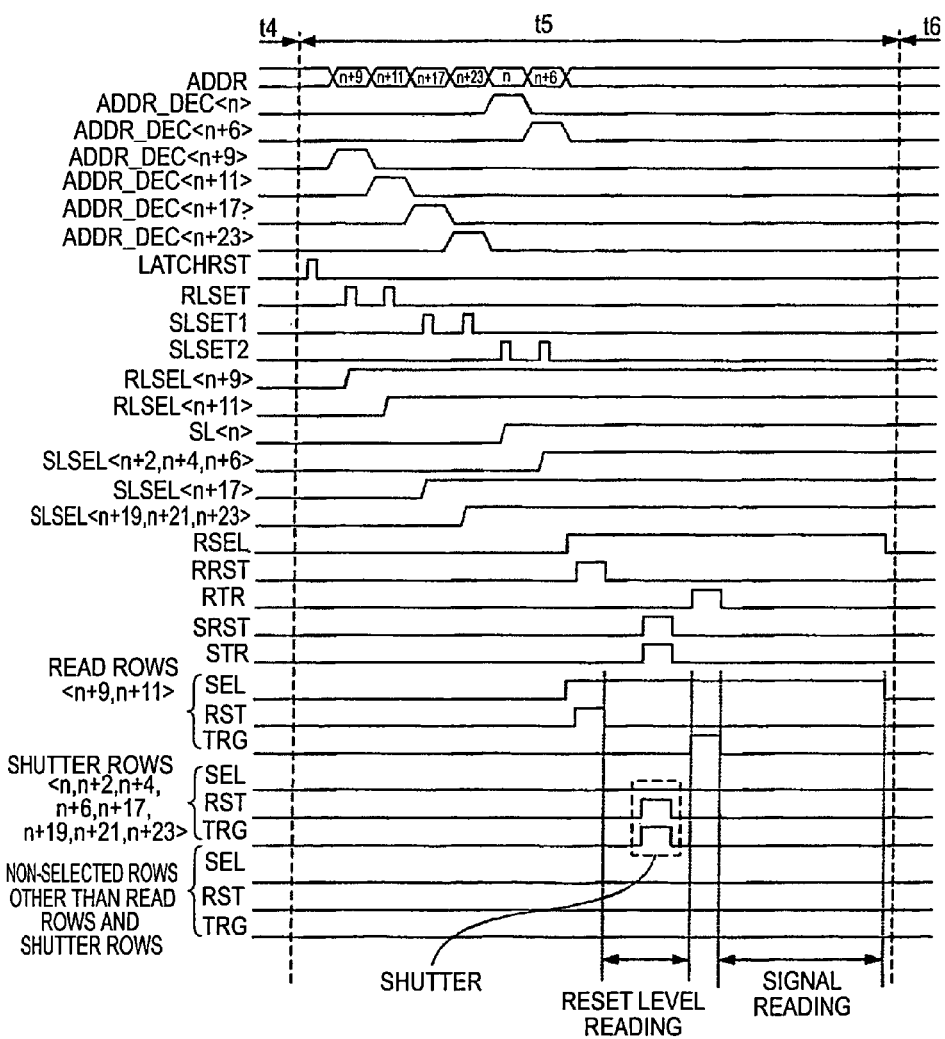
FIG. 13 is a view showing a timing chart of the row selection circuit according to the second embodiment.

FIG. 13 is a view showing a timing chart of the row selection circuit according to the second embodiment.

FIG. 13 is an example of the timing chart at the time (period) "t5" of FIG. 7.

First, the sensor controller 150A allows the latch reset signal LATCHRST to be H to reset all read latches RL and shutter latches SL1, SL2 in the row selection circuit 130A.

Next, the read addresses, the shutter addresses of the reading frame and the shutter addresses of the next frame are set in the row selection circuit 130A.

In the period "t5" of FIG. 7, the "n+9"th row and the "n+11"th row are selected as read rows. When the read addresses are written, "n+9" is outputted to the address signal ADDR at first to allow the RLSET to be H and RL<n+9> is set.

Next, "n+11" is outputted to the address signal ADDR to allow the RLSET to be H and RL<n+11> is set.

In the period "t5", "n+17" to "n+23" are selected as shutter addresses of the reading frame.

When the shutter addresses of the reading frame are written, "n+17" is outputted to the address signal ADDR at first to allow the SLSET1 to be H and SL<n+17> is set.

Next, "n+23" is outputted to the address signal ADDR to allow the SLSET1 to be H and SL<n+19>, SL<n+21> and SL<n+23> are set.

Furthermore, in the period "t5", "n" to "n+6" are selected as shutter addresses of the next frame. When the next shutter addresses are written, "n" is outputted to the address signal ADDR at first to allow the shutter latch set signal SLSET2 to be H and the shutter latch SL<n> is set.

Next, "n+6" is outputted to the address signal ADDR to allow the shutter latch set signal SLSET2 to be H and the shutter latches SL<n+2>, SL<n+4> and SL<n+6> are set.

After the read addresses are set, the selection timing control signals RSEL, RRST and RTR are allowed to be H appropriately, thereby performing reading operation.

After the shutter addresses are set, the selection timing control signals SRST, STR are allowed to be H appropriately, thereby performing shutter operation.

In the example of FIG. 13, shutter addresses of the reading frame are set in the shutter latches SL1 and shutter addresses of the next frame are set in the shutter latches SL2, however, the reverse may be applied.

In the example of FIG. 13, addresses are set in the order of the read addresses, the shutter addresses of the reading frame and shutter addresses of the next frame, however, the order may be changed.

It is necessary that the reading operation is performed after setting the read addresses and that the shutter operation is performed after setting the shutter addresses, however, the setting of the read addresses and the shutter operation, the setting of the shutter addresses and the reading operation can be performed at arbitrary timing.

The reading operation and the shutter operation can be also performed at arbitrary timing.

<3. Third Embodiment>

Figure 14:
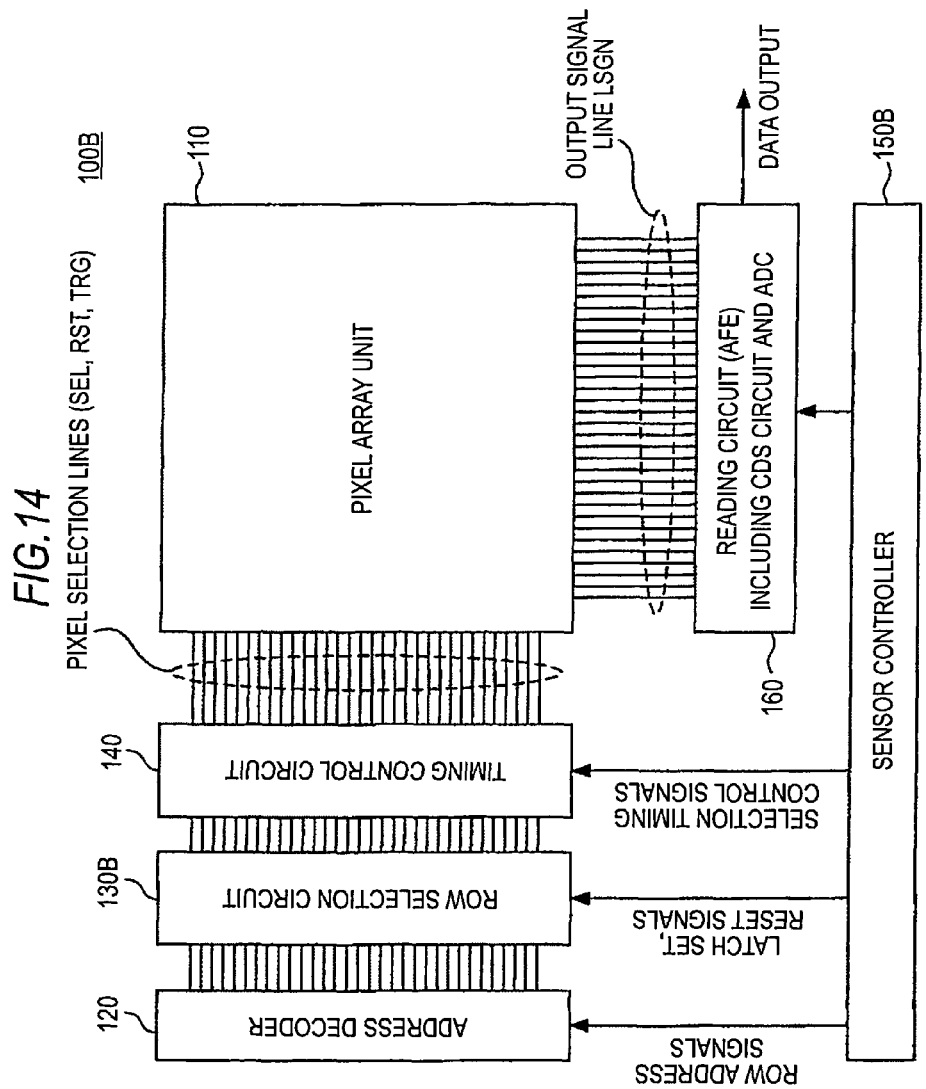
FIG. 14 is a view showing a configuration example of a CMOS image sensor according to a third embodiment of the invention.

FIG. 14 is a view showing a configuration example of a CMOS image sensor (solid-state imaging device) according to a third embodiment.

A CMOS image sensor 100B according to the third embodiment includes the pixel array unit 110, the address decoder 120 and a row selection circuit 130B for selecting pixels in the same manner as the second embodiment.

The CMOS image sensor 100B includes the timing control circuit 140 and a sensor controller 150B and a reading circuit (AFE) 160.

The CMOS image sensor according to the third embodiment can apply the configuration of FIG. 11 in the same manner as the second embodiment.

The configuration of the pixel array unit and the pixel circuit can apply the configuration of FIG. 5 in the same manner as the first embodiment.

The address decoder 120 according to the third embodiment decodes address signals from the sensor controller 150B and selects particular rows.

The row selection circuit 130B according to the third embodiment records addresses of read rows and shutter rows in accordance with the latch set signal and the latch reset signal from the sensor controller 150B and the address signals from the address decoder 120.

The timing control circuit 140 allows all or part of respective M-pieces of control lines SEL, RST and TRG to be H in accordance with selection timing signals from the sensor controller 150B and row addresses recorded in the row selection circuit 130B.

The sensor controller 150B according to the third embodiment controls the row selection circuit 130A, the address decoder 120 and the reading circuit (AFE) 160 with proper timing.

The reading circuit (AFE) 160 according to the third embodiment reads signals VSL outputted to the output signal lines LSGN in accordance with the control signal from the sensor controller 150B and outputs the signals to the outside.

The color filters according to the third embodiment may have regular arrangement with respect to one row to several rows in the same manner as the first embodiment.

Hereinafter, the case of Bayer arrangement shown in FIG. 6 will be explained.

The lowest address signal ADDR_L and the highest address signal ADDR_H are inputted to the address decoder 120 according to the third embodiment from the sensor controller 150B.

The address decoder 120 decodes the address signals ADDR_L, ADDR_H and outputs address decoded signals ADDR_DEC_L, ADDR_DEC_H of respective rows.

M-pieces of address decoded signals ADDR_DEC_L and ADDR_DEC_H are provided.

For example, when M is 2048, ADDR_L is 11'h010 and ADDR_H is 11'h014, only ADDR_DEC_L<16> and ADDR_DEC_H<20> are allowed to be H in the address decoded signals, and address decoded signals other than the above are allowed to be L.

Figure 15:
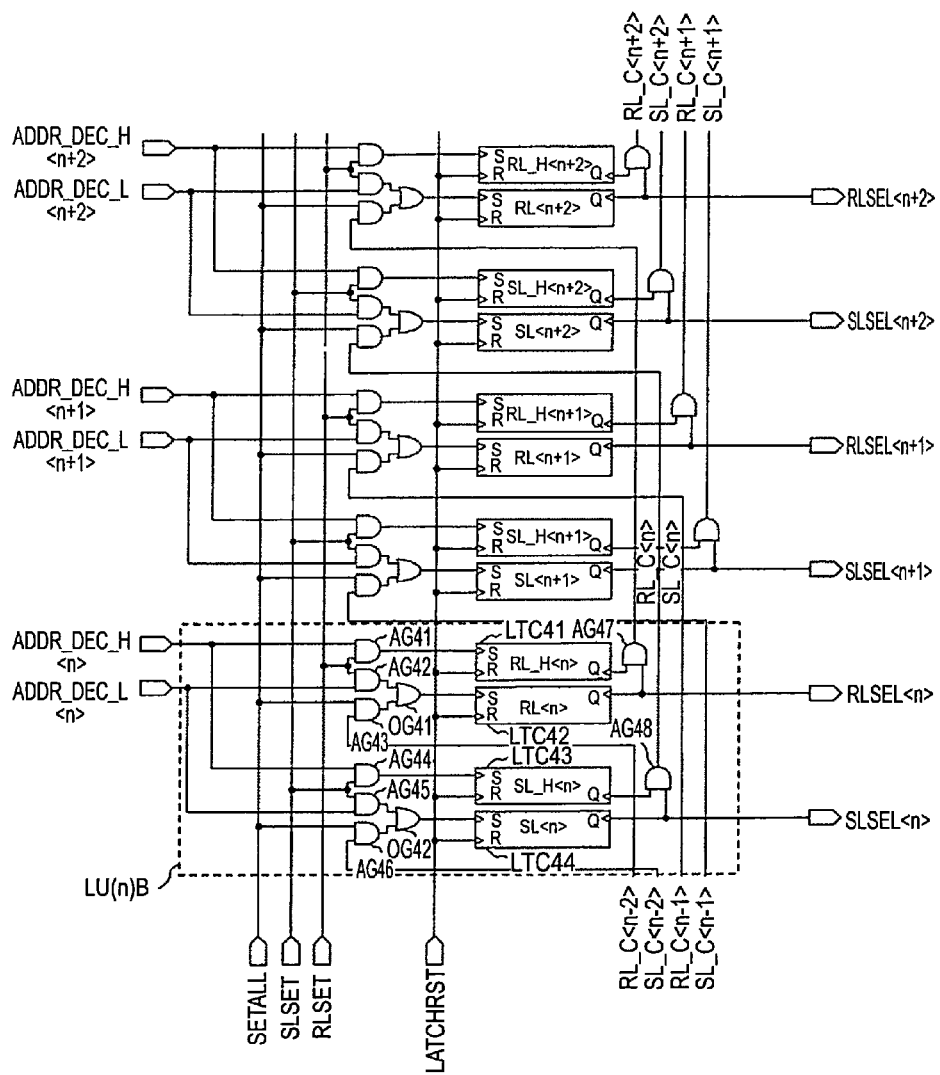
FIG. 15 is a circuit diagram showing a configuration example of the row selection circuit according to a third embodiment.

FIG. 15 is a view showing a configuration example of the row selection circuit according to the embodiment.

FIG. 15 shows only a part in which "n"th to "n+2"th rows of the pixel array unit 110 are selected.

The row selection circuit 130B of FIG. 14 includes 2-input AND gate AG41 to AG48, 2-input OR gates OG41, OG42 and latches LTC41 to LTC44.

The latch LTC41 functions as the highest read latch RL_H, the latch LTC42 functions as the read latch RL, the latch LTC43 functions as the highest shutter latch SL_H and the latch LTC44 functions as the shutter latch SL.

A first input terminal of the AND gate AG41 is connected to a supply line of the highest address decoded signal ADDR_DEC_H<n> and a second input terminal is connected to a supply line of a read latch set signal RLSET.

An output terminal of the AND gate AG41 is connected to a set terminal S of the latch LTC 41.

A first input terminal of the AND gate AG42 is connected to a supply line of the lowest address decoded signal ADDR_DEC_L<n> and a second input terminal is connected to a supply line of the read latch signal RLSET.

An output terminal of the AND gate AG42 is connected to a first input terminal of the OR gate OG41.

A first input terminal of the AND gate AG43 is connected to a supply line of a plural-rows latch set signal SETALL and a second input terminal is connected to a supply line of a carry signal RL_C<n−2> of the AND gate AG47 of a row unit LU<n−2>B which is a stage two rows previous to a row unit LU<n>B.

An output terminal of the AND gate AG43 is connected to a second input terminal of the OR gate OG41.

An output terminal of the OR gate OG41 is connected to a set terminal S of the latch LTC42.

A first input terminal of the AND gate AG44 is connected to a supply line of the highest address decoded signal ADDR_DEC_H<n> and a second input terminal is connected to a supply line of a shutter latch set signal SLSET.

An output terminal of the AND gate AG44 is connected to a set terminal S of the latch LTC43.

A first input terminal of the AND gate AG45 is connected to a supply line of the lowest address decoded signal ADDR_DEC_L<n> and a second input terminal is connected to a supply line of the shutter latch set signal SLSET.

An output terminal of the AND gate AG45 is connected to a first input terminal of the OR gate OG42.

A first input terminal of the AND gate AG46 is connected to a supply line of the plural-rows latch set signal SETALL and a second input terminal is connected to a supply line of the carry signal SL_C<n−2> of the AND gate AG48 of the row unit LU<n−2>B which is the stage two rows previous to the row unit LU<n>B.

An output terminal of the AND gate AG46 is connected to a second input terminal of the OR gate OG42.

An output terminal of the OR gate OG42 is connected to a set terminal S of the latch LTC 44.

Reset terminals R of latches LTC41 to LTC44 are connected to a supply line of the latch reset signal LATCHRST in common.

An inverted output terminal/Q ("/" indicates inversion) of the latch LTC41 is connected to a first input terminal of the AND gate AG47.

An output terminal Q of the latch LTC42 is connected to a second input terminal of the AND gate AG47 and a read row selection signal RLSEL<n> is outputted from the output terminal Q.

An inverted output terminal/Q ("/" indicates inversion) of the latch LTC43 is connected to a first input terminal of the AND gate AG48.

An output terminal Q of the latch LTC44 is connected to a second input terminal of the AND gate AG48 and the shutter row selection signal SLSEL<n> is outputted from the output terminal Q.

The latch reset signal LATCHRST, the read latch set signal RLSET, the shutter latch set signal SLSET and the plural-rows latch set signal SETALL are inputted to the row selection circuit 130B from the sensor controller 150B.

Furthermore, the lowest address decoded signal ADDR_DEC_L and the highest decoded signal ADDR_DEC_H are inputted to the row selection circuit 130B from the address decoder 120.

The row selection circuit-130B outputs the read row selection signal RLSEL and the shutter row selection signal SLSEL to the timing control circuit 140.

The row selection circuit 130B includes row units LU equivalent to the number of rows (M-pieces) of the pixel array unit 110.

A row unit LU<n>B arranged at the "n"th row includes a read latch RL<n> indicating whether the "n"th row is in the selected state as the read row or not and a shutter latch SL<n> indicating whether the "n"th row is in the selected state as the shutter row or not.

Furthermore, the row unit LU<n>B includes the highest read latch RL_H<n> indicating whether the "n"th row is the highest address of the read row or not and the highest shutter latch SL_H<n> indicating whether the "n"th row is the highest address of the shutter row or not.

In the example of FIG. 14, the read latch RL, the shutter latch SL, the highest read latch RL_H and the highest shutter latch SL_H are configured by the SR latch.

To row unit LU<n>B of the "n"th row, the address decoded signals ADDR_DEC_L<n>, ADDR_DEC_H<n> from the address decoder 120, and the carry signals RL_C<n−2>, SL_C<n−2> from an adjacent row are inputted.

The row unit LU<n>B of the "n"th row outputs the read row selection signal RLSEL<n>, the shutter row selection signal SLSEL<n> and the carry signals to an adjacent row RL_C<n>, SL_C<n>.

The latch reset signal LATCHRST, the read latch set signal RLSET and the shutter latch set signal SLSET are supplied to all row units LU.

When the latch reset signal LATCHRST is allowed to be H, the read latches RL, the shutter latches SL and the highest read latches RL_H and the highest shutter latches SL_H in the row selection circuit are reset and all rows are allowed to be in the non-selected state.

The read latch RL<n> is set when both the read latch set signal RLSET and the address decoded signal ADDR_DEC_L<n> are H, or both the plural-row latch set signal SETALL and the carry signal RL_C<n−2> are H.

Then, the read latch RL<n> outputs the read row selection signal RLSEL<n> in the H level.

The highest read latch RL_H<n> is set when both the read latch set signal RLSET and the address decoded signal ADDR_DEC_H<n> are H, outputting the signal in the L level.

When the read latch RL<n> is set and the highest read latch RL_H is reset, the row unit LU<n>B outputs the carry signal RL_C<n> in the H level.

Conversely, when the read latch RL<n> is reset, or when the highest read latch RL_H is set, the row unit LU<n>B outputs the carry signal RL_C<n> in the L level.

Therefore, when the plural-row latch set signal SETALL is allowed to be H in the state in which the read latch RL<n> is set and the highest read latch RL_H<n> is not set, the read latch RL of the "n+2"th is also set, and the "n+2"th row is selected as the real row.

When the highest read latch RL_H<n> is set, the rows subsequent to the "n+2"th row are not selected even when the plural-row latch set signal SETALL is allowed to be H, because the carry signal is L.

The shutter latch SL<n> is set when both the shutter latch set signal SLSET and the address decoded signal ADDR_DEC_L<n> are H, or when both the plural-line latch set signal SETALL and the carry signal SL_C<n−2> are H.

Then, the shutter latch SL<n> outputs the shutter row selection signal SLSEL<n> in the H level.

The highest shutter latch SL_H<n> is set when both the shutter latch set signal SLSET and the address decoded signal ADDR_DEC_H<n> are H, outputting the signal with the L level.

When the shutter latch SL<n> is set and the highest shutter latch SL_H<n> is reset, the row unit LU<n>B outputs the carry signal SL_C<n> in the H level.

Conversely, when the shutter latch SL<n> is reset or when the highest shutter SL_H is set, the row unit LU outputs the carry signal SL_C<n> in the L level.

Therefore, when the plural-row latch set signal SETALL is allowed to be H in the state in which the shutter latch SL<n> is set and the highest shutter latch SL_H<n> is not set, the shutter latch SL of the "n+2"th row is also set. As a result, the "n+2"th is selected as the shutter row.

When the highest shutter latch SL_H<n> is set, the rows subsequent to the "n+2"th row are not selected even when the plural-row latch set signal SETALL is allowed to be H, because the carry signal is L.

As described above, the carry signals are connected in pairs of rows in the row units, thereby selecting plural successive pixels in pairs of rows easily. It is necessary that ADDR_H=ADDR_L+2m (m is an arbitrary integer) when selecting plural rows in pairs.

The row selection circuit 130B can write successive addresses plural times in the read latches and the shutter latches by providing lathes in which the highest addresses are recorded.

The timing control circuit 140 according to the third embodiment can apply the configuration of FIG. 9 in the same manner as the first embodiment.

Figure 16:
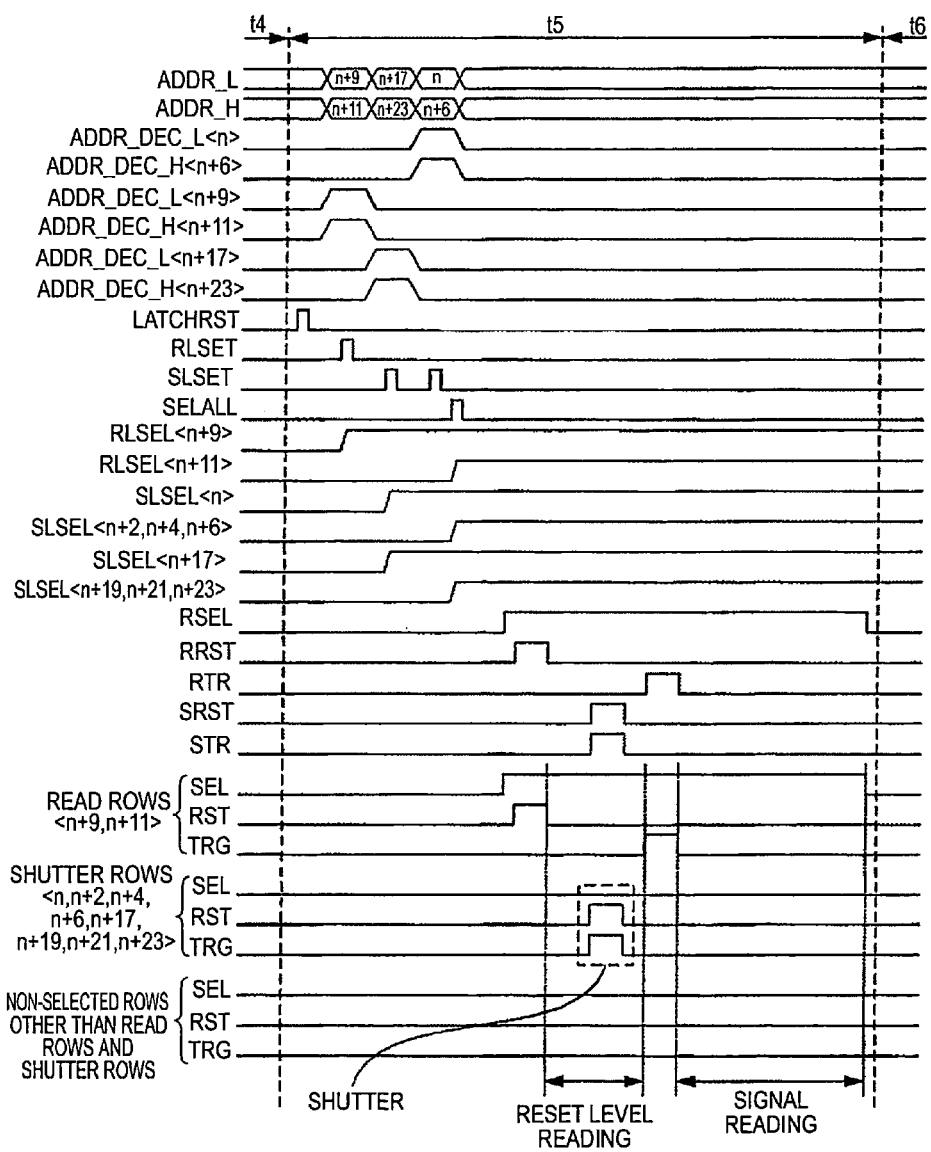
FIG. 16 is a view showing a timing chart of the row selection circuit according to the third embodiment.

FIG. 16 is a view showing a timing chart of the row selection circuit according to the third embodiment.

FIG. 16 is an example of the timing chart at the time (period) "t5" of FIG. 7.

First, the sensor controller 150B allows the latch reset signal LATCHRST to be H to reset all read latches and shutter latches in the row selection circuit 130A.

Next, the read addresses, the shutter addresses of the frame during reading and the shutter addresses of the next frame are set in the row selection circuit 130B.

Next, the lowest address and the highest address of read rows are set.

In the period "t5" of FIG. 7, the "n+9"th row and the "n+11"th row are selected as read rows.

Accordingly, "n+9" is outputted to the lowest address signal ADDR_L and "n+11" is outputted to the highest address signal ADDR_H to allow RLSET to be H, and the read latch RL<n+9> and the highest read latch RL_H<n+11> are set.

Next, the lowest shutter address and the highest shutter address of the reading frame are set.

In the period "t5", "n+17" to "n+23" are selected as shutter addresses of the reading frame.

Accordingly, "n+17" is outputted to the lowest address signal ADDR_L, and "n+23" is outputted to the highest address signal ADDR_H to allow the SLSET to be H, and the shutter latch SL<n+17> and the highest shutter latch SL_H<n+23> are set.

Next, the lowest shutter address and the highest shutter address of the next frame are set.

In the period "t5", "n" to "n+6" are selected as shutter addresses of the next frame.

Accordingly, "n" is outputted to the lowest address signal ADDR_L and "n+6" is outputted to the highest address signal ADDR_H to allow SLSET to be H, and the shutter latch SL<n> and the highest shutter latch SL_H<n+6> are set.

After the read addresses and the shutter addresses of the reading frame and the shutter addresses of the next frame are set, the plural-row latch set signal SETALL is allowed to be H and latches from the lowest address to the highest address are set.

That is, the read latch RL<n+9>, shutter latches SL<n+2>, SL<n+4>, SL<n+6>, SL<n+19>, SL<n+21> and SL<n+23> are set.

According to the row selection circuit 130B of the third embodiment, successive addresses can be written at plural times as described above.

After the read addresses are set, the selection timing control signals RSEL, RRST and RTR are allowed to be H appropriately, thereby performing reading operation.

After the shutter addresses are set, the selection timing signals SRST, STR are allowed to be H appropriately, thereby performing shutter operation.

In the example of FIG. 16, addresses are set in the order of the read addresses, the shutter addresses of the reading frame and the shutter addresses of the next frame, however, the order may be changed.

It is necessary to perform reading operation after setting the read addresses and to perform shutter operation after setting the shutter addresses, however, setting of the read addresses and shutter operation as well as setting of the shutter addresses and read operation can be performed at arbitrary timing.

The reading operation and the shutter operation can be also performed at arbitrary timing.

As described above, the following advantages are obtained according to the embodiment.

That is, according to the first to third embodiments, plural successive rows can be selected at the same time.

Additionally, according to the second and third embodiments, plural addresses can beset to latches of the row selection circuit at short time.

Accordingly, the necessary horizontal scanning period can be shortened even when accessing to plural rows at the same time, therefore, "adding" and "thinning-out" operations can be performed easily.

The CMOS image sensor according to respective embodiments is not particularly limited, however, it is possible to be configured as a CMOS image sensor on which a column-parallel type analog/digital converter (abbreviated as ADC (Analog Digital Converter) in the following description) is mounted.

The solid-state imaging device having the above advantages can be applied as an imaging device of a digital camera and a video camera.

<4. Fourth Embodiment>

Figure 17:
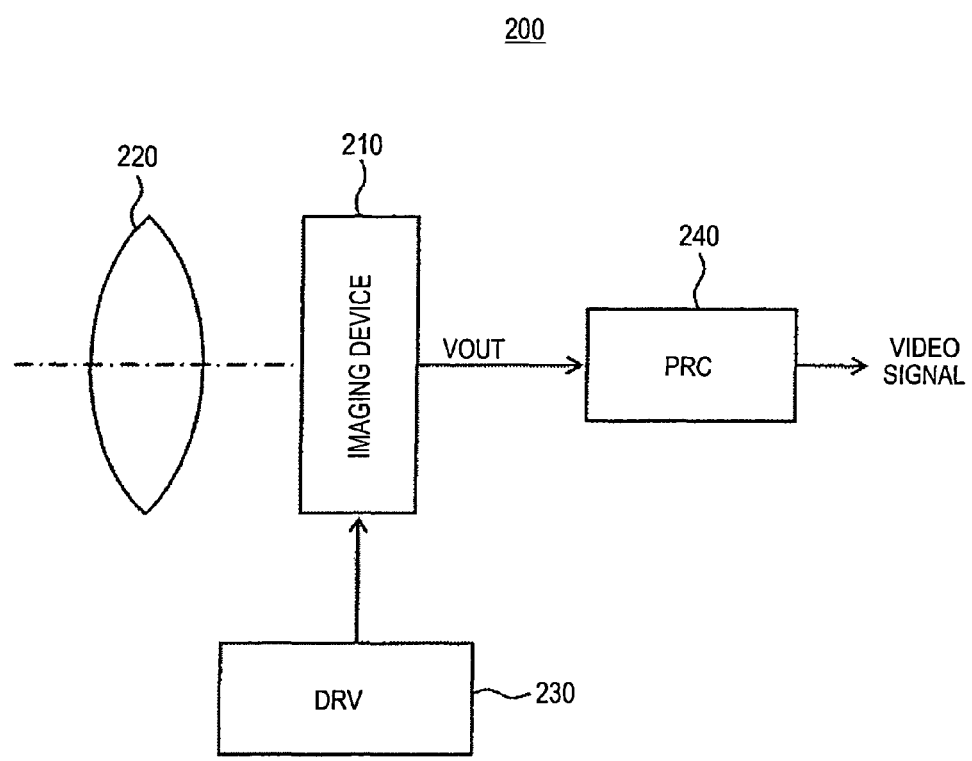
FIG. 17 is a view showing a configuration example of a camera system to which the solid-state imaging device is applied according to a fourth embodiment of the invention.

FIG. 17 is a view showing a configuration example of a camera system to which the solid-state imaging device is applied according to a fourth embodiment of the invention.

A camera system 200 includes an imaging device 210 to which the CMOS image sensor (solid-state imaging device) 100 according to the embodiment can be applied as shown in FIG. 17.

The camera system 200 further includes an optical system leading incident light to a pixel region of the imaging device 210 (focusing a subject image), that is, for example, a lens 220 which focuses incident light (subject light) on an imaging surface.

The camera system 200 includes a drive circuit (DRV) 230 driving the imaging device 210 and a signal processing circuit (PRC) 240 processing output signals of the imaging device 210.

The drive circuit 230 has a timing generator (not shown) generating various types of timing signals including a start pulse and a clock pulse for driving circuits in the imaging device 210, driving the imaging device 210 by using the given timing signals.

The signal processing circuit 240 performs given signal processing to output signals of the imaging device 210.

Image signals processed in the signal processing circuit 240 are recorded in a recording medium such as a memory.

The image information recorded in the recording medium is hard copied by a printer and the like. The image signals processed in the signal processing circuit 240 are played back on a monitor including a liquid crystal display and the like as moving images.

As described above, in the imaging devices such as the digital still camera, the above CMOS image sensor (solid-state imaging device) 100 is applied as the imaging device 210, thereby realizing high-definition camera with low power consumption.

The present application contains subject matter related to that disclosed in Japanese Priority Patent Application JP 2009-252442 filed in the Japan Patent Office on Nov. 2, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel unit in which plural pixels each having a photoelectric conversion element which converts light signals into electric signals and accumulates the electric signals according to exposure time are arranged in a matrix state;
plural control lines for drive controlling the pixels; and
a pixel drive unit controlling operation of the pixels to perform electronic shutter operation and reading of the pixel unit through the control lines,
wherein the pixel drive unit outputs read row selection signals and shutter row selection signals of row addresses of read rows from which signals are read and shutter rows from which charges accumulated in the photoelectric conversion elements are swept out and reset in accordance with address signals,
selects a unit of plural rows of plural successive rows by designating the lowest address signal and the highest address signal,
wherein the pixel drive unit includes row units arranged so as to correspond to respective rows of row arrangement in the pixel unit, the row units being configured to output the read row selection signals, the shutter row selection signals and carry signals, and
wherein, in each of the row units,
the lowest address decoded signal of the read row, the highest address decoded signal of the read row, the lowest address decoded signal of the shutter row of a reading frame, the highest address decoded signal of the shutter row of the reading frame, the lowest address decoded signal of the shutter row of a next frame, the highest address decoded signal of the shutter rows of the next frame, and a carry signal of an adjacent row unit of a previous row are supplied,
rows from a row designated by the lowest address decoded signal of the read row to a row designated by the highest address decoded signal of the read row are selected in the unit of plural rows,
rows from a row designated by the lowest address decoded signal of the shutter row of the reading frame to a row designated by the highest address decoded signal of the shutter row of the reading frame as well as rows from a row designated by the lowest address decoded signal of the shutter row of the next frame to a row designated by the highest address decoded signal of the shutter row of the next frame are selected in the unit of plural rows.

2. The solid-state imaging device according to claim 1,
wherein each of the row units outputs the read row selection signal in an active state when the lowest address decoded signal of the read row or the carry signal of the read row is active,
outputs the carry signal to the adjacent row unit in the active state to allow the read row selection signal of the adjacent row unit to be outputted in the active state when the read row selection signal is active as well as the highest address decoded signal of the read row is inactive, and
outputs the read row selection signal in the active state and outputs the carry signal to the adjacent row unit in the inactive state to allow the read row selection signal to the adjacent row unit to be in the inactive state when the highest address decoded signal of the read row is active.

3. The solid-state imaging device according to claim 1,
wherein the row unit of the pixel drive unit
outputs the shutter row selection signal in the active state when the lowest address decoded signal of the shutter row of the reading frame or the lowest address decoded signal of the shutter row of the next frame is active, or when the carry signal from the adjacent shutter row is active.

4. The solid-state imaging device according claim 1,
wherein the row unit of the pixel drive unit
outputs the carry signal to the adjacent row unit in the active state when the shutter row selection signal is active, or when the highest address decoded signal of the shutter row of the reading frame or the highest address decoded signal of the shutter row of the next frame is inactive.

5. The solid-state imaging device according to claim 1,
wherein the row unit of the pixel drive unit
outputs the carry signal to the adjacent row in the inactive state to allow the read row selection signal of the adjacent row to be inactive in the case that the highest address decoded signal of the shutter row of the reading frame or the highest address decoded signal of the shutter row of the next frame is active, even when the read row selection signal is active.

6. The solid-state imaging device according to claim 1,
wherein the pixel drive unit selects plural rows at the same time in the unit of plural rows when pixels of the same color are arranged in the unit of plural rows.

7. The solid-state imaging device according to claim 1,
wherein the pixel drive unit selects plural rows at the same time in the unit of plural rows when pixels of the same color are arranged in the unit of plural rows.

8. A camera system comprising:
a solid-state imaging device;
an optical system focusing a subject image on the solid-state imaging device; and
a signal processing circuit processing output image signals from the solid-state imaging device,
wherein the solid-state imaging device includes
a pixel unit in which plural pixels each having a photoelectric conversion element which converts light signals into electric signals and accumulates the electric signals according to exposure time are arranged in a matrix state,
plural control lines for drive controlling the pixels, and
a pixel drive unit controlling operation of the pixels to perform electronic shutter operation and reading of the pixel unit through the control lines, in which the pixel drive
outputs read row selection signals and shutter row selection signals of row addresses of read rows from which signals are read and shutter rows from which charges accumulated in the photoelectric conversion elements are swept out and reset in accordance with address signals, and
selects a unit of plural rows of plural successive rows by designating the lowest address signal and the highest address signal,
wherein the pixel drive unit includes row units arranged so as to correspond to respective rows of row arrangement in the pixel unit, the row units being configured to output the read row selection signals, the shutter row selection signals and carry signals, and
wherein, in each of the row units,
the lowest address decoded signal of the read row, the highest address decoded signal of the read row, the lowest address decoded signal of the shutter row of a reading frame, the highest address decoded signal of the shutter row of the reading frame, the lowest address decoded signal of the shutter row of a next frame, the highest address decoded signal of the shutter rows of the next frame, and a carry signal of an adjacent row unit of a previous row are supplied,
rows from a row designated by the lowest address decoded signal of the read row to a row designated by the highest address decoded signal of the read row are selected in the unit of plural rows,
rows from a row designated by the lowest address decoded signal of the shutter row of the reading frame to a row designated by the highest address decoded signal of the shutter row of the reading frame as well as rows from a row designated by the lowest address decoded signal of the shutter row of the next frame to a row designated by the highest address decoded signal of the shutter row of the next frame are selected in the unit of plural rows.

9. The camera system according to claim 8,
wherein each of the row units outputs the read row selection signal in an active state when the lowest address decoded signal of the read row or the carry signal of the read row is active,
outputs the carry signal to the adjacent row unit in the active state to allow the read row selection signal of the adjacent row unit to be outputted in the active state when the read row selection signal is active as well as the highest address decoded signal of the read row is inactive, and
outputs the read row selection signal in the active state and outputs the carry signal to the adjacent row unit in the inactive state to allow the read row selection signal to the adjacent row unit to be in the inactive state when the highest address decoded signal of the read row is active.

10. The camera system according to claim 8,
wherein the row unit of the pixel drive unit
outputs the shutter row selection signal in the active state when the lowest address decoded signal of the shutter row of the reading frame or the lowest address decoded signal of the shutter row of the next frame is active, or when the carry signal from the adjacent shutter row is active.

11. The camera system according claim 8,
wherein the row unit of the pixel drive unit
outputs the carry signal to the adjacent row unit in the active state when the shutter row selection signal is active, or when the highest address decoded signal of the shutter row of the reading frame or the highest address decoded signal of the shutter row of the next frame is inactive.

12. The camera system according to claim 8,
wherein the row unit of the pixel drive unit
outputs the carry signal to the adjacent row in the inactive state to allow the read row selection signal of the adjacent row to be inactive in the case that the highest address decoded signal of the shutter row of the reading frame or the highest address decoded signal of the shutter row of the next frame is active, even when the read row selection signal is active.

13. The camera system device according to claim 8,
wherein the pixel drive unit selects plural rows at the same time in the unit of plural rows when pixels of the same color are arranged in the unit of plural rows.

14. The camera system device according to claim 8,
wherein the pixel drive unit selects plural rows at the same time in the unit of plural rows when pixels of the same color are arranged in the unit of plural rows.

* * * * *